US012778834B2

United States Patent
(12) United States Patent
Chang et al.

(10) Patent No.: US 12,778,834 B2
(45) Date of Patent: Nov. 3, 2026

(54) SYSTEMS AND METHODS FOR IMPROVING VISION OF A VIEWER'S EYE WITH IMPAIRED RETINA

(71) Applicant: HES IP HOLDINGS, LLC, Austin, TX (US)

(72) Inventors: Yin Chang, Taipei City (TW); Jiunn-Yiing Lai, New Taipei City (TW); Feng-Chun Yeh, Taipei City (TW); Guo-Hsuan Chen, Taichung City (TW); Ya-Chun Chou, Taipei City (TW); Szu-Yen Yueh, Taichung City (TW)

(73) Assignee: Oomii Inc., Grand Cayman (KY)

(*) Notice: Subject to any disclaimer, the term of this patent is extended or adjusted under 35 U.S.C. 154(b) by 400 days.

(21) Appl. No.: 18/019,526

(22) PCT Filed: Jun. 13, 2022

(86) PCT No.: PCT/US2022/033321
§ 371 (c)(1),
(2) Date: Feb. 3, 2023

(87) PCT Pub. No.: WO2022/261567
PCT Pub. Date: Dec. 15, 2022

(65) Prior Publication Data

US 2023/0201067 A1 Jun. 29, 2023

Related U.S. Application Data

(60) Provisional application No. 63/209,405, filed on Jun. 11, 2021.

(51) Int. Cl.
*A61B 3/00* (2006.01)
*A61B 3/02* (2006.01)
(Continued)

(52) U.S. Cl.
CPC ..... *A61H 5/005* (2013.01); *A61H 2201/0157* (2013.01); *A61H 2201/0188* (2013.01);
(Continued)

(58) Field of Classification Search
CPC .. A61B 3/02; A61B 3/00; A61B 3/102; A61B 3/1025; A61B 3/113; A61B 3/1015;
(Continued)

(56) References Cited

U.S. PATENT DOCUMENTS 1,072,216 A 9/1913 Dunn
4,953,961 A 9/1990 Ubhayakar
(Continued)

FOREIGN PATENT DOCUMENTS

CN 101862178 A 10/2010
CN 102014732 A 4/2011
(Continued)

OTHER PUBLICATIONS

PCT/US2020/059317 International Search Report and Written Opinion issued on Feb. 5, 2021.
(Continued)

*Primary Examiner* — Dawayne Pinkney
(74) *Attorney, Agent, or Firm* — Chen Yoshimura LLP

(57) ABSTRACT

A portable system and method for training an alternate retinal location of a viewer's eye with impaired retina and an assistance system for improving vision of such viewer's eye are disclosed. The portable system for training comprises an eye tracking module to provide eye information of the viewer's eye and a virtual image display module to display a virtual image centered at the alternate retinal location on the viewer's impaired retina other than centered at a fovea. The virtual image display module further comprises a first light signal generator to generate multiple first light signals and a first combiner to redirect the multiple first light signals
(Continued)

towards the alternate retinal location, when a pupil of the viewer's eye is located approximately at the center of the viewer's eye.

8 Claims, 18 Drawing Sheets

(51) Int. Cl.
*A61B 3/024* (2006.01)
*A61B 3/10* (2006.01)
*A61B 3/12* (2006.01)
*A61H 5/00* (2006.01)
*G02B 27/01* (2006.01)

(52) U.S. Cl.
CPC ................ *A61H 2201/1607* (2013.01); *A61H 2201/5007* (2013.01); *A61H 2201/5043* (2013.01); *A61H 2201/5048* (2013.01); *A61H 2201/5092* (2013.01)

(58) Field of Classification Search
CPC ....... A61B 3/1225; A61B 3/024; A61B 3/005; G02C 5/00; G02B 27/0149; G02B 27/0103; G02B 27/0172; G02B 27/145; G02B 27/0101
USPC ............... 351/203, 200, 205, 206, 209, 210, 351/221–223, 245–246; 359/618, 359/630–634; 353/11–12, 28, 119
See application file for complete search history.

(56) References Cited

U.S. PATENT DOCUMENTS 5,677,795 A 10/1997 Hegg
5,754,344 A 5/1998 Fujiyama
6,454,411 B1 9/2002 Trumbull
8,123,353 B2 2/2012 Biernat et al.
8,248,458 B2 8/2012 Schowengerdt et al.
9,028,067 B1 * 5/2015 Fleischman .......... G09B 21/008 351/209
9,186,293 B2 11/2015 Krenik
9,492,083 B2 11/2016 Rege et al.
10,031,338 B2 7/2018 Alexander et al.
10,108,144 B2 10/2018 Robbins et al.
10,234,699 B2 3/2019 Yoshida
10,467,770 B2 11/2019 Sato et al.
10,877,210 B2 12/2020 Karafin et al.
11,079,601 B2 8/2021 Greenberg
11,256,092 B2 2/2022 Shamir et al.
12,231,613 B2 2/2025 Lai et al.
2002/0122217 A1 9/2002 Nakajima
2002/0180868 A1 12/2002 Lippert et al.
2004/0233275 A1 11/2004 Tomita
2008/0117289 A1 5/2008 Schowengerd et al.
2011/0032706 A1 2/2011 Mukawa
2011/0273722 A1 11/2011 Charny et al.
2011/0304821 A1 12/2011 Tanassi et al.
2012/0002163 A1 1/2012 Neal
2012/0050269 A1 3/2012 Awaji
2012/0056799 A1 3/2012 Solomon
2013/0127980 A1 5/2013 Haddick et al.
2013/0296710 A1 11/2013 Zuzak et al.
2013/0335543 A1 * 12/2013 Hilkes .................... G06F 3/013 348/62
2015/0169070 A1 6/2015 Harp et al.
2015/0324568 A1 11/2015 Publicover et al.
2015/0326570 A1 11/2015 Publicover et al.
2015/0338915 A1 11/2015 Publicover et al.
2016/0004908 A1 1/2016 Lundberg
2016/0062459 A1 3/2016 Publicover et al.
2016/0085302 A1 3/2016 Publicover et al.
2016/0150201 A1 5/2016 Kilcher et al.
2016/0178908 A1 6/2016 Dobschal et al.
2016/0234482 A1 8/2016 Bickerstaff et al.
2016/0238845 A1 8/2016 Alexander et al.
2016/0246441 A1 8/2016 Westerman et al.
2016/0274660 A1 9/2016 Publicover et al.
2016/0377865 A1 12/2016 Alexander et al.
2017/0027651 A1 2/2017 Esterberg
2017/0068091 A1 3/2017 Greenberg
2017/0068119 A1 * 3/2017 Antaki .................... G06F 3/012
2017/0078651 A1 3/2017 Russell
2017/0090202 A1 3/2017 Tatsuta
2017/0235931 A1 8/2017 Publicover et al.
2017/0367651 A1 12/2017 Tzvieli et al.
2018/0008141 A1 1/2018 Krueger
2018/0017815 A1 1/2018 Chumbley et al.
2018/0091805 A1 3/2018 Liang et al.
2018/0157317 A1 6/2018 Richter et al.
2018/0182174 A1 6/2018 Choi
2018/0185665 A1 7/2018 Osterhout et al.
2018/0246336 A1 8/2018 Greenberg
2018/0249151 A1 8/2018 Freeman et al.
2018/0252926 A1 9/2018 Alexander et al.
2018/0262758 A1 9/2018 El-Ghoroury et al.
2018/0284441 A1 10/2018 Cobb
2018/0348524 A1 * 12/2018 Blum ................. G02B 27/0176
2018/0356591 A1 12/2018 Karafin et al.
2019/0018479 A1 1/2019 Minami
2019/0084419 A1 3/2019 Suzuki et al.
2019/0121132 A1 4/2019 Shamir et al.
2019/0172216 A1 6/2019 Ninan et al.
2019/0179409 A1 * 6/2019 Jones ................. G02B 27/0172
2019/0187473 A1 6/2019 Tomizawa et al.
2019/0200858 A1 7/2019 Yam et al.
2019/0222830 A1 7/2019 Edwin et al.
2019/0282082 A1 * 9/2019 Wahl .................... A61B 3/0025
2019/0285897 A1 9/2019 Topliss et al.
2019/0293939 A1 9/2019 Sluka
2019/0320165 A1 10/2019 French et al.
2019/0361250 A1 11/2019 Lanman et al.
2019/0391398 A1 12/2019 Abou et al.
2020/0097065 A1 3/2020 Iyer et al.
2020/0117006 A1 4/2020 Kollin et al.
2020/0138518 A1 5/2020 Lang
2020/0184730 A1 * 6/2020 Watola .................... G06F 3/011
2020/0241650 A1 7/2020 Kramer et al.
2021/0003848 A1 1/2021 Choi et al.
2021/0003900 A1 1/2021 Chen
2021/0015364 A1 1/2021 Rege et al.
2021/0055555 A1 2/2021 Chi et al.
2021/0120222 A1 4/2021 Holz et al.
2021/0278671 A1 9/2021 Hsiao et al.
2022/0146839 A1 5/2022 Miller
2023/0408758 A1 12/2023 Karafin et al.

FOREIGN PATENT DOCUMENTS

CN 103119512 A 5/2013
CN 104010561 A 8/2014
CN 104812342 A 7/2015
CN 105208916 A 12/2015
CN 105527710 A 4/2016
CN 106537290 A 3/2017
CN 107438796 A 12/2017
CN 108024870 A 5/2018
CN 108427498 A 8/2018
CN 109073901 A 12/2018
CN 109716244 A 5/2019
CN 110168427 A 8/2019
CN 106054403 B 1/2020
CN 111163682 A 5/2020
CN 112558751 A 3/2021
JP H08-166556 A 6/1996
JP H08-262366 A 10/1996
JP H09-105885 A 4/1997
JP H11-142763 A 5/1999
JP 2000-214408 A 8/2000
JP 2008-509438 A 3/2008
JP 2011-13688 A 1/2011
JP 2011-255045 A 12/2011

(56) References Cited

FOREIGN PATENT DOCUMENTS

| | | | |
|---|---|---|---|
| JP | 2013-211308 | A | 10/2013 |
| JP | 2014-130204 | A | 7/2014 |
| JP | 2016122085 | A | 7/2016 |
| JP | 2016-180939 | A | 10/2016 |
| JP | 2018-508036 | A | 3/2018 |
| JP | 2018-132756 | A | 8/2018 |
| JP | 2018-166165 | A | 10/2018 |
| JP | 2018-533062 | A | 11/2018 |
| JP | 2019-176974 | A | 10/2019 |
| JP | 2023-500177 | A | 1/2023 |
| JP | 7849065 | B2 | 4/2026 |
| KR | 20120069133 | A | 6/2012 |
| TW | 201014571 | A | 4/2010 |
| TW | 201716827 | A | 5/2017 |
| TW | 201809214 | A | 3/2018 |
| TW | I619967 | B | 4/2018 |
| WO | 00/30528 | A1 | 6/2000 |
| WO | 2015-079610 | A1 | 6/2015 |
| WO | 2016105281 | A | 6/2016 |
| WO | 2018/025125 | A1 | 2/2018 |
| WO | 2021092314 | A1 | 5/2021 |
| WO | 2021258078 | A1 | 12/2021 |
| WO | 2022036302 | A1 | 2/2022 |
| WO | 2022051688 | A1 | 3/2022 |
| WO | 2022072565 | A1 | 4/2022 |
| WO | 2022072754 | A2 | 4/2022 |
| WO | 2022159911 | A1 | 7/2022 |
| WO | 2022170284 | A1 | 8/2022 |

OTHER PUBLICATIONS

PCT/US2021/038318 International Search Report and Written Opinion issued on Sep. 24, 2021.
PCT/US2021/046078 International Search Report and Written Opinion issued on Nov. 24, 2021.
PCT/US2021/052750 International Search Report and Written Opinion issued on Dec. 28, 2021.
PCT/US2021/053048 International Search Report and Written Opinion issued on Jan. 14, 2022.
PCT/US2022/015717 International Search Report and Written Opinion issued on May 23, 2022.
PCT/US2022/013771 International Search Report and Written Opinion issued on Apr. 14, 2022.
U.S. Appl. No. 17/179,423 Final Rejection issued on Jul. 11, 2022.
U.S. Appl. No. 17/179,423 Non-Final Rejection issued on Jan. 21, 2022.
PCT/US2021/038318 International Preliminary Report issued on Jul. 28, 2022.
Kim, J et al., "Foveated AR: Dynamically-Foveated Augmented Reality Display" pp. 1-15 [online]. Jul. 12, 2019; ACM Transactions on Graphics vol. 38, Issue 4 [Retrieved on Apr. 9, 2022]. Retrieved from the internet <url: https://dl.acm.org/doi/10.1145/3306346.3322987>; DOI: https://doi.org/10.1145/3306346.3322987.
PCT/US2021/046078 International Preliminary Report issued on Dec. 16, 2022.
PCT/US2021/052750 International Preliminary Report issued on Dec. 6, 2022.
PCT/US2022/033321 International Search Report and Written Opinion issued on Nov. 15, 2022.
PCT/US2021/049171 International Search Report and Written Opinion mailed issued on Dec. 6, 2021.
European Search Report, dated Aug. 22, 2024 in a counterpart European patent application No. 22821211.4.
Chinese Office Action, dated Jul. 16, 2025, and Search Report dated Jul. 14, 2025, in a counterpart Chinese patent application, No. CN 202280006838.4.
Japanese Office Action, dated Jul. 22, 2025 in a related or a counterpart Japanese patent application, No. JP 2024-112123.
Japanese Office Action dated Oct. 8, 2024 in a counterpart or related Japanese patent application, No. JP 2023-518350 (English translation of the Office Action is appended after the Japanese language document in the same PDF.).
Japanese Office Action issued on Dec. 3, 2024 in a counterpart or related Japanese patent application, No. JP 2024-112123 (English translation of the Office Action is appended after the Japanese language document in the same PDF.).
Japanese Office Action, dated Apr. 16, 2024 in a counterpart or related Japanese patent application, No. JP 2023-518350.
Taiwanese Office Action, dated Aug. 23, 2022, in a counterpart or related Taiwanese patent application, No. TW 109141615.
Taiwanese Office Action, dated Jan. 16, 2023, in a counterpart or related Taiwanese patent application, No. TW 111121911.
European Search Report, dated Nov. 21, 2023, in a counterpart or related EP patent application, No. EP 20886006.4.
Taiwanese Office Action, dated Nov. 27, 2023, in a counterpart or related Taiwanese patent application, No. TW 112112456.
Chinese Office Action, dated Mar. 12, 2026, in a counterpart Chinese patent application, No. CN 202280006838.4.

* cited by examiner

SYSTEMS AND METHODS FOR IMPROVING VISION OF A VIEWER'S EYE WITH IMPAIRED RETINA

RELATED APPLICATION

This application claims the benefit of the provisional application 63/209,405 filed on Jun. 11, 2021, titled "VISION-ASSISTED DEVICE FOR USERS WITH IMPAIRED RETINA," which is incorporated herein by reference at its entirety.

In addition, the PCT international application PCT/US20/59317, filed on Nov. 6, 2020, titled "SYSTEM AND METHOD FOR DISPLAYING AN OBJECT WITH DEPTHS" is incorporated herein by reference at its entirety.

BACKGROUND OF THE INVENTION

Field of the Invention

The present invention relates systems for training a viewer's eye with impaired retina and improving vision of such viewer's eye; more particularly, a system for training alternate retinal locations on a viewer's eye with impaired retina for improving vision of the viewer's eye.

Description of Related Art

Persons with impaired retina lose their vision in the central or peripheral region of the field of vision. Persons suffered with age-related macular degeneration (AMD) lose their vision from the central region of their field of vision. Persons suffered with glaucoma lose their vision form the peripheral region of their field of vision. A person's eye with impaired retina usually has a damaged macula (or macula lutea) which is an oval-shaped pigmented area near the center of the retina of the person's eye. A person's macula usually has a diameter of around 5.5 mm (0.22 in) and is subdivided into the umbo, foveola, foveal avascular zone, fovea, parafovea, and perifovea areas. The macula is responsible for the central, high-resolution, color vision that is possible in good light. The fovea is responsible for sharp central vision (also called foveal vision), which is necessary in humans for activities for which visual detail is of primary importance, such as reading and driving. The fovea is surrounded by the parafovea belt and the perifovea outer region.

When a person's eye fixates on an object, usually he or she will use the fovea centralis to aim at the object to get a better resolution of the image of the object. Therefore, the visual axis is defined as an imaginary line between the object and fovea centralis. As mentioned before, impaired retina may be caused by AMD, glaucoma, or other diseases. Persons with impaired retina may result in blurred or no vision in the center or peripheral of the visual field. A person's vision may be improved by training a preferred retinal locus (PRL) of the viewer's eye, which remains healthy, to respond to received light signals. Therefore, portable systems for training a PRL on a viewer's eye with impaired retina and assistance systems for improving vision of the viewer's eye are desirable.

SUMMARY

The present disclosure relates to portable systems and methods for training an alternate retinal location on a viewer eye with impaired retina and, thus, improving vision of the viewer's eye. The viewer's impaired retina may be caused by age-related macular degeneration (AMD), glaucoma, or other diseases. AMD patients have degenerated macula which may result in blurred or no vision in the center of the visual field. The glaucoma patients lose their field of view in the peripheral regions, rather than the central region. These patients' vision in the center or peripheral regions of their visual field may be improved by training an alternate retinal location on the viewer's eye, which remains healthy, to respond to received light signals. The alternate retinal location is sometimes also referred to as preferred retinal locus (PRL). A portable system for training an alternate retinal location on a viewer's eye with an impaired retina comprises an eye tracking module and a virtual image display module. The eye tracking module provides eye information of the viewer's eye. The virtual image display module displays a virtual image centered at the alternate retinal location on the viewer's eye other than a fovea when a pupil of the viewer's eye is located approximately at the center of the viewer's eye based on the eye information from the eye tracking module. The virtual image display module comprises a first light signal generator and a first combiner. The first light signal generator generates multiple first light signals for the virtual image. The first combiner redirects the multiple first light signals from the first light signal generator towards the alternate retinal location on the viewer's eye to display multiple first pixels of the virtual image.

After the alternate retinal location on the viewer's eye is trained to replace the fovea for fixation, assistance systems and methods may be used to improve the vision of his or her eye with impaired retina by projecting a virtual image corresponding to a target object onto the fovea and its adjacent regions (for glaucoma patients) or trained alternate retinal location (for AMD patients) of the viewer's eye with impaired retina. An assistance system for improving vision comprises an image capture module, a process module, and a virtual image display module. The image capture module is configured to either capture the view straightforward ahead of the viewer's eye (default target object) or a specific target object the viewer's eye(s) fixate, and thus receives multiple image pixels. The process module configured to generate information of a virtual image related to the target object. The virtual image display module includes a first light signal generator and a first combiner. The first light signal generator generates multiple first light signals for the virtual image based on the information of the virtual image provided by the process module. For viewers with impaired macula, in particular the fovea and its adjacent region, such as AMD patients, the first combiner redirects the multiple first light signals from the first light signal generator towards the alternate retinal location on the viewer's eye, other than the fovea, to display multiple first pixels of the virtual image. For viewers with impaired retina at peripheral regions of their vision field, such as glaucoma patients, the first combiner redirects the first light signals onto the central region of the macula that remains healthy, including fovea and its neighboring region.

The alternate retinal location is selected from a portion of retina that remains healthy. The selection guidance of alternate retinal location includes (1) the height of the alternate retinal location and (2) relative position of the alternate retinal location to the fovea to allow binocular fixation when eyeballs turn around. First, a first height of the alternate retinal location on the viewer's eye with impaired retina should be selected to be closer to a second height of a preferred sensing location of the viewer's the other eye with or without impaired retina. Second, the alternate retinal location should be selected at an outer side of the fovea of the viewer's eye with impaired retina so that when the viewer's eyeballs fixate at a peripheral region of his/her visual field, the visual axis of both eyes from either the alternate retinal location or the preferred sensing location may cross each other at the target object where viewer's eyes fixate.

Once the alternate retinal location is selected, a coordinate of the alternate retinal location is generated based on a landmark of the viewer's eye with impaired retina to provide an accurate position for the virtual image display module to project the virtual image. The landmark may be an optic nerve head of the viewer's eye with impaired retina.

DETAILED DESCRIPTION OF PREFERRED EMBODIMENTS

Figure 1:
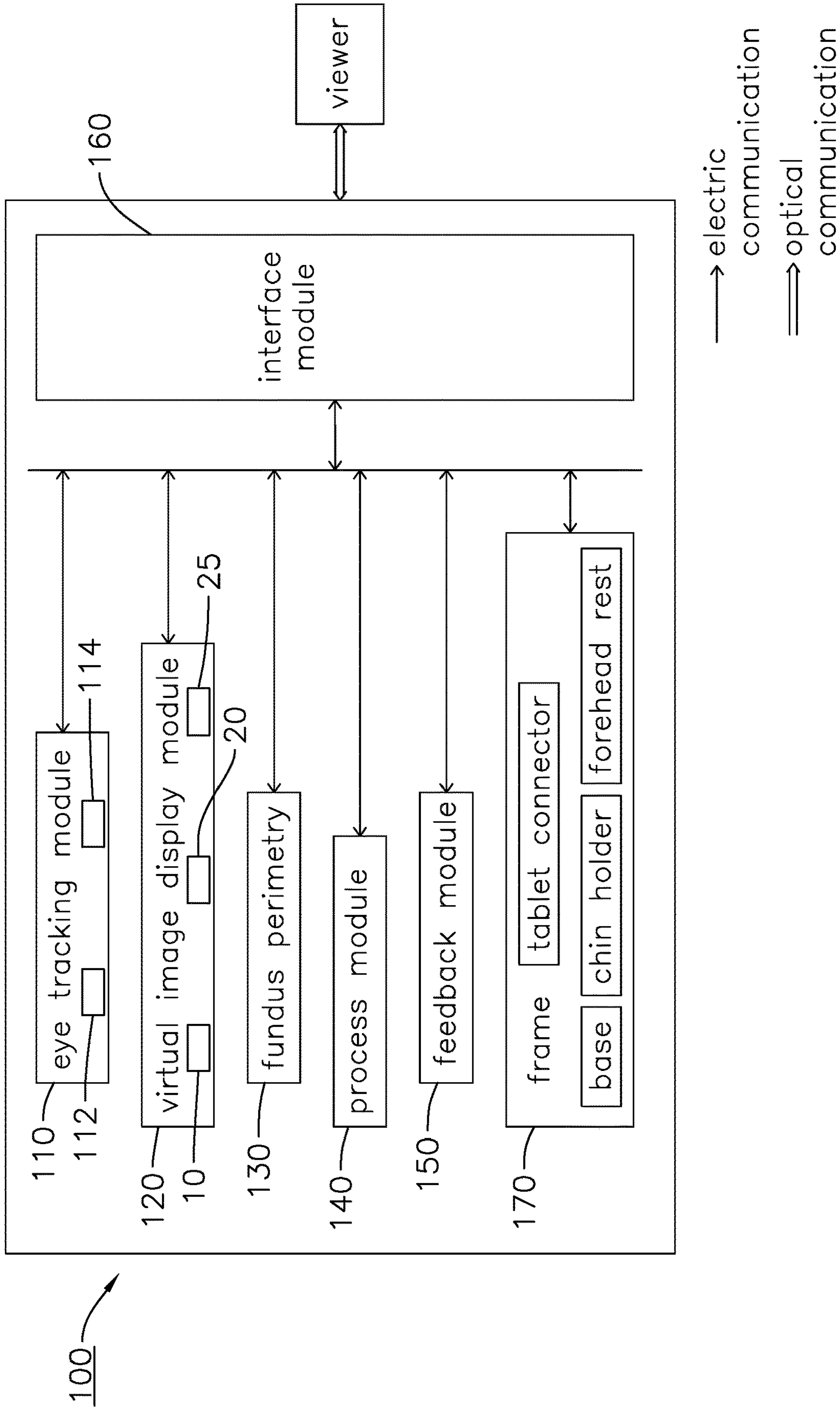
FIG. 1 is a block diagram illustrating an embodiment of a system for training an alternate retinal location on a viewer's eye with impaired retina in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The present disclosure relates to portable systems and methods for training an alternate retinal location on a viewer eye with impaired retina and, thus, improving vision of the viewer's eye. The viewer's impaired retina may be caused by age-related macular degeneration (AMD), glaucoma, or other diseases. AMD patients have degenerated macula which may result in blurred or no vision in the center of the visual field. The glaucoma patients lose their field of view in the peripheral regions, rather than the central region. These patients' vision in the center or peripheral regions of their visual field may be improved by training an alternate retinal location on the viewer's eye, which remains healthy, to respond to received light signals. The alternate retinal location is sometimes also referred to as preferred retinal locus (PRL). A portable system for training an alternate retinal location on a viewer's eye with an impaired retina comprises an eye tracking module and a virtual image display module. The eye tracking module provides eye information of the viewer's eye. The virtual image display module displays a virtual image centered at the alternate retinal location on the viewer's eye other than centered at a fovea when a pupil of the viewer's eye is located approximately at the center of the viewer's eye based on the eye information from the eye tracking module. The virtual image display module comprises a first light signal generator and a first combiner. In other words, the viewer's eye fixates straightforward ahead and a visual axis of the viewer's eye is approximately normal to a frontal plane of the viewer in that situation. The first light signal generator generates multiple first light signals for the virtual image. The first combiner redirects the multiple first light signals from the first light signal generator towards the alternate retinal location on the viewer's eye to display multiple first pixels of the virtual image.

After the alternate retinal location on the viewer's eye is trained to replace the fovea for fixation, assistance systems and methods may be used to improve the vision of his or her eye with impaired retina by projecting a virtual image corresponding to a target object onto the fovea and its adjacent regions (for glaucoma patients) or trained alternate retinal location (for AMD patients) of the viewer's eye with impaired retina. An assistance system for improving vision comprises an image capture module, a process module, and a virtual image display module. The image capture module is configured to either capture the view straightforward ahead of the viewer's eye (default target object) or a specific target object the viewer's eye(s) fixate, and thus receives multiple image pixels. In another embodiment, the image capture module also receives the corresponding depths of the multiple image pixels. The process module configured to generate information of a virtual image related to the target object. The virtual image display module includes a first light signal generator and a first combiner. The first light signal generator generates multiple first light signals for the virtual image based on the information of the virtual image provided by the process module. For viewers with impaired macula, in particular the fovea and its adjacent region, such as AMD patients, the first combiner redirects the multiple first light signals from the first light signal generator towards the alternate retinal location on the viewer's eye, other than the fovea, to display multiple first pixels of the virtual image. For viewers with impaired retina at peripheral regions of their vision field, such as glaucoma patients, the first combiner redirects the first light signals towards the central region of the macula that remains healthy, including fovea and its neighboring region.

The alternate retinal location is selected from a portion of retina that remains healthy. Multiple locations on the viewer's retina may be available to serve as the alternate retinal location. The selection from these multiple available locations would affect the possibility of binocular fusion between the viewer's two eyes. Thus, the alternate retinal location should be selected to facilitate binocular fusion. The selection guidance of alternate retinal location includes (1) the height of the alternate retinal location and (2) relative position of the alternate retinal location to the fovea to allow binocular fixation when eyeballs turn around. First, a first height of the alternate retinal location on the viewer's eye with impaired retina should be selected to be closer to a second height of a preferred sensing location of the viewer's the other eye with or without impaired retina. In other words, the first height is about the same as the second height. Second, the alternate retinal location should be selected at an outer side of the fovea of the viewer's eye with impaired retina so that when the viewer's eyeballs fixate at a peripheral region of his/her visual field, the visual axis of both eyes from either the alternate retinal location or the preferred sensing location may cross each other at the target object where viewer's eyes fixate.

Once the alternate retinal location is selected, a coordinate of the alternate retinal location is generated based on a landmark of the viewer's eye with impaired retina to provide an accurate position for the virtual image display module to project the virtual image. The landmark may be an optic nerve head of the viewer's eye with impaired retina.

As shown in FIG. 1, a portable system 100 for training an alternate retinal location of a viewer's eye with an impaired retina comprises an eye tracking module 110 and a virtual image display module 120. The eye tracking module 110 is configured to track a viewer's eye and provide related eye information, such as eye movement, pupil location, pupil size, gaze angle (view angle; view axis), and convergence angle of the viewer's eye. The eye tracking module 110 may comprise a first camera 112 to track the eye with an impaired retina. The virtual image display module 120 projects a virtual image onto a predetermined alternate retinal location of the viewer's eye to provide stimulation for training purpose when a pupil of the viewer's eye is located approximately at the center of the viewer's eye based on the eye information from the eye tracking module 110. At that moment, the viewer's eyes fixate at a point straightforward ahead and the visual axis of the viewer's eye is also approximately normal to a frontal plane of the viewer. The virtual image may be predetermined by a doctor, a training specialist, or the viewer. In one embodiment, the predetermined virtual image is a cross symbol in red or green color.

Figure 2:
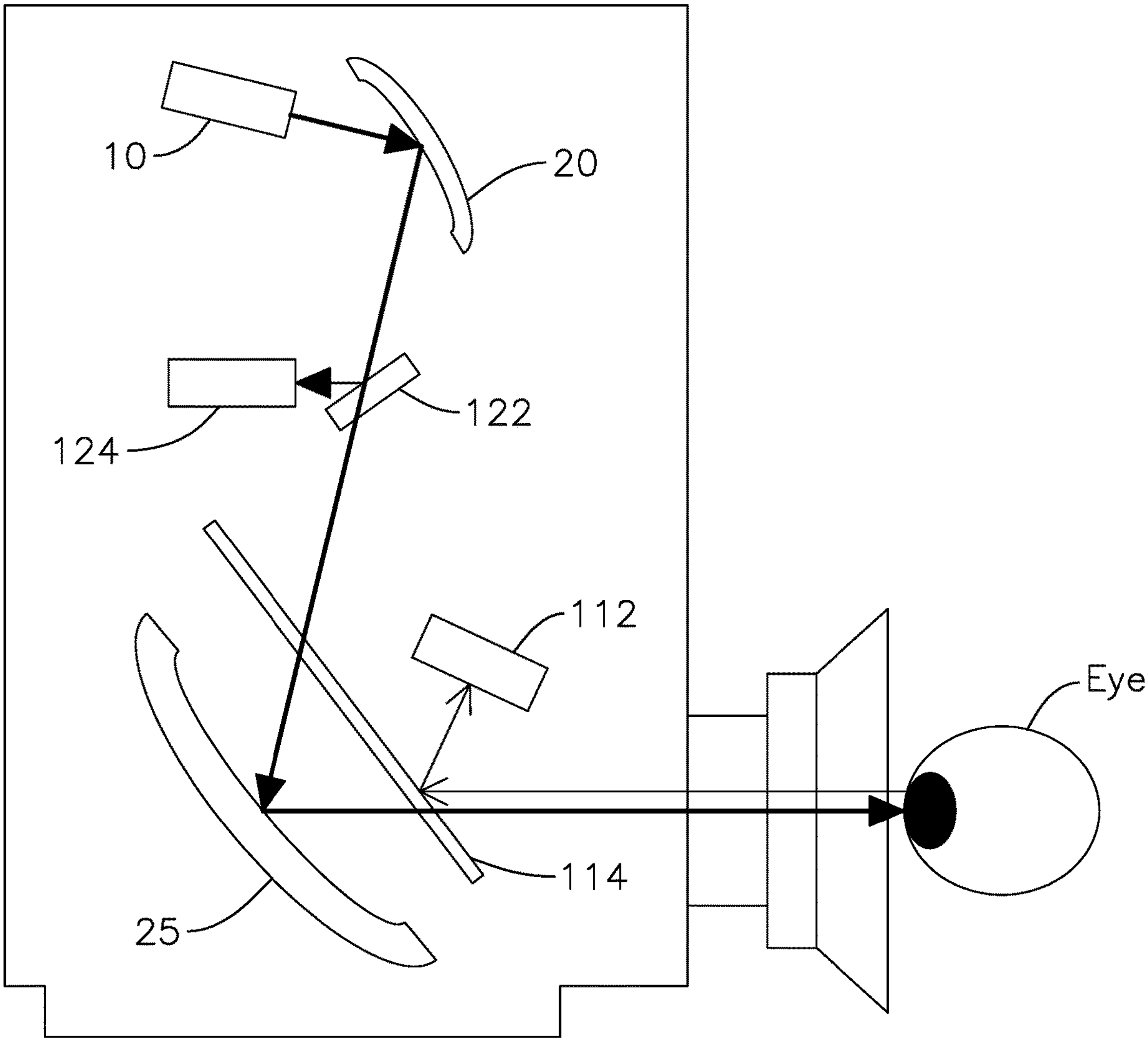
FIG. 2 is a schematic diagram illustrating an embodiment of virtual image display module and eye tracking module in accordance with the present invention.

As described above, the eye tracking module 110 is configured to track the viewer's one eye or both eyes and provide the related eye information, such as, pupil location, pupil size, gaze angle (view angle), and convergence angle of the viewer's each eye. Such eye information may be used to determine whether a pupil of the viewer's eye is located approximately at the center of the viewer's eye with an impaired retina. In one embodiment as shown in FIG. 2, the eye tracking module 110 may include a first camera 112 and an eye tracking reflector 114 to track the viewer's eye with an impaired retina. The eye tracking reflector 114 may have about 100% reflection rate for IR lights in the embodiment. The first camera 112 may further include an IR laser diode and an IR light sensor. The eye tracking reflector 114 is disposed on the light path between the first camera 112 and the viewer's eye. The IR lights generated by the IR laser diode are reflected by the eye tracking reflector 114 and then projected onto the viewer's eye. The IR lights reflected from the viewer's eye travel back to the IR light sensor via the eye tracking reflector 114 to analyze and determine the eye information, including the pupil location. In another embodiment, the viewer's both eyes have an impaired retina. The eye tracking module 110 may further include a second camera 116 to track the viewer's another eye. In addition to traditional eye tracking cameras, the first camera 112 and the second camera 116 may be built by the technologies of ultra-compact micro-electromechanical systems (MEMS). The first camera 112 and the second camera 116 may use ultra-red emitters and sensors to detect and derive various eye information. The eye tracking module 110 may further include an integrated inertial measurement unit (IMU), an electronic device that measures and reports a body's specific force, angular rate, and sometimes the orientation of the body, using a combination of accelerometers, gyroscopes, and sometimes magnetometers.

The eye tracking module 110 may measure the position and size of the pupil of the viewer's eye and determine the extent or degree the pupil is away from the center of the viewer's eye. In one embodiment, the eye tracking device 110 receives and analyzes 60 frames every second of the reflected IR lights to determine the pupil location. When the pupil of the viewer's eye is more than a predetermined degree away from the center of the viewer's eye, such as 0.5 degree, the eye tracking module 110 may inform the virtual image display module 120 to take an action in repose.

Figure 3:
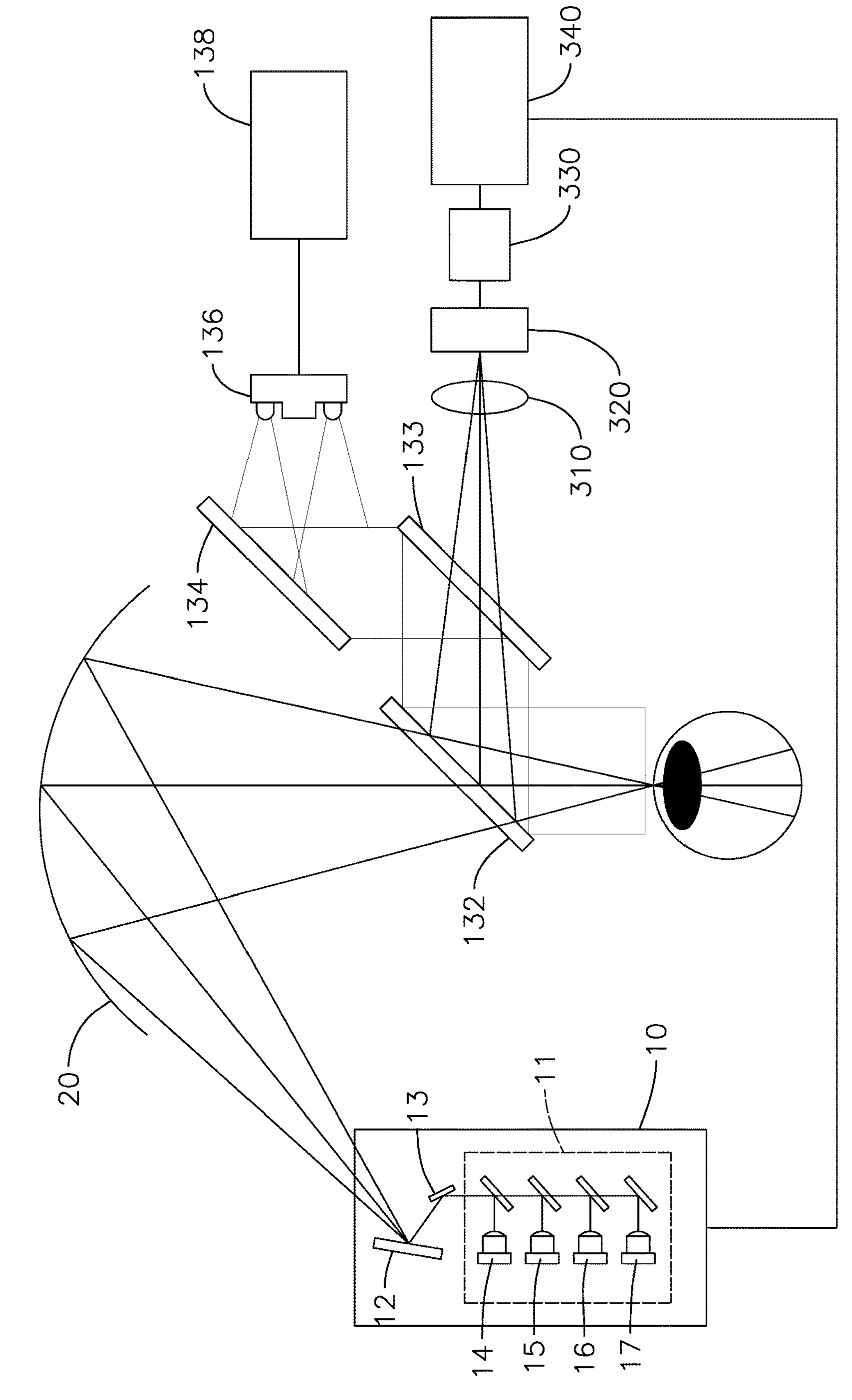
FIG. 3 is a schematic diagram illustrating an embodiment of first light signal generator and first combiner in accordance with the present invention.

As shown in FIG. 3, the virtual image display module 120 includes a first light signal generator 10 and a first combiner 20. The first light signal generator 10 may use laser, light emitting diode ("LED") including mini and micro LED, organic light emitting diode ("OLED"), or superluminescent diode ("SLD"), LCoS (Liquid Crystal on Silicon), liquid crystal display ("LCD"), or any combination thereof as its light source. In one embodiment, the light signal generator 10 is a laser beam scanning projector (LBS projector) which may comprise the light source 11 including a red color light laser 15, a green color light laser 16, and a blue color light laser 17, a light color modifier, such as Dichroic combiner and Polarizing combiner and a two-dimensional (2D) adjustable reflector 12, such as a 2D electromechanical system ("MEMS") minor. In another embodiment, the light source 11 may further include an IR (infrared) light laser 14. The first light signal generator 10 may further include a collimator 13 positioned between the light source 11 and the 2D adjustable reflector 12 to cause the motion directions of the light signals to become more aligned (parallel) at a specific direction. The collimator 160 may be a curved lens or a convex lens. The 2D adjustable reflector 12 may be replaced by two one dimensional (1D) reflector, such as two 1D MEMS minor. The LBS projector sequentially generates and scans light signals one by one to form a 2D virtual image at a predetermined resolution, for example 1280×720 pixels per frame. Thus, one light signal for one pixel is generated and projected at a time towards the first combiner 20. For a user to see such a 2D virtual image from one eye, the LBS projector has to sequentially generate light signals for each pixel, for example 1280×720 light signals, within the time period of persistence of vision, for example 1/18 second. Thus, the time duration of each light signal is about 60.28 nanosecond.

In another embodiment, the first light signal generator 10 may be a digital light processing projector ("DLP projector")

which can generate a 2D color image at one time. Texas Instrument's DLP technology is one of several technologies that can be used to manufacture the DLP projector. The whole 2D color image frame, which for example may comprise 1280×720 pixels, is simultaneously projected towards the first combiner 20.

The first combiner 20 receives and redirects multiple light signals generated by the first light signal generator 10 onto the alternate retinal location of the viewer's eye other than the fovea. Here the first combiner 20 may function as a reflector. The first combiner 20 may be made of glasses or plastic materials like lens, coated with certain materials such as metals to make it reflective. One advantage of using a reflective combiner instead of a wave guide in the prior art for directing light signals to the user's eyes is to eliminate the problem of undesirable diffraction effects, such as multiple shadows, color displacement . . . etc.

In another embodiment as shown in FIG. 2, the optical path of the virtual image display module 120 may be designed to further comprise a supplemental first combiner 25. The light signals generated from the first light signal generator 10 are projected towards the first combiner 20, which redirects the light signals towards the supplemental first combiner 25, which further redirects the light signals towards the alternate retinal location of the viewer's eye other than the fovea. In addition, the virtual image display module 120 may further include a safety reflector 122 disposed between the first combiner 20 and the supplemental first combiner 25, and a safety sensor 124. In one embodiment, the reflection ration of the reflector 122 is about 10% with about 90% of the light signals passing through. The safety sensor 124 receives the reflected light signals from the reflector 122 and measures their intensity. If the intensity of the light signals exceeds a predetermined value, the safety sensor 124, for the safety reason, will notify the first light signal generator 10 to turn off the power of the light source or to block the light signals from projecting into the viewer's eye to avoid damaging the eye.

In one embodiment, to precisely control the whereabouts on the viewer's eye the first light signals are projected onto, the first combiner 20 and the supplemental first combiner 25, having 6 degrees of freedoms, may be independently adjusted by moving along and/or rotating around a horizontal axis (or pitch axis, X axis), a perpendicular axis (or longitudinal axis, Y axis), and/or a depth axis (or vertical axis, Z axis) for a certain degree, for example rotating 5 degrees. The horizontal axis may be set to be along the direction of interpupillary line. A perpendicular axis may be set to be along the facial midline and perpendicular to the horizontal direction. A depth direction (or vertical axis, Z axis direction) may be set to be normal to the frontal plane and perpendicular to both the horizontal and perpendicular directions. To be more specific, the first combiner 20 and the supplemental first combiner 25 may be rotated around the horizontal axis to move the light signal projecting location to the up or down of the viewer's retina, rotated around the perpendicular axis to move the light signal projecting location to the right or left of the viewer's retina, and/or moved along the depth axis to adjust an eye relief.

As described above, the virtual image display module 120 projects a virtual image onto a predetermined alternate retinal location of the viewer's eye to provide stimulation for training purpose when a pupil of the viewer's eye is located approximately at the center of the viewer's eye based on the eye information from the eye tracking module 120. At that moment, the viewer's eyes fixate at a point straightforward ahead and the visual axis of the viewer's eye is also approximately normal to a frontal plane of the viewer. The visual axis is an imaginary line connecting a fixation point and a fovea of the viewer's eye through a pupil. This is the most natural and easiest fixation point for a viewer. As a result, a viewer need not rotate his/her eyeballs for training an alternate retinal location. With such fixation training of the viewer's eye with impaired retina, the viewer, such as an AMD patient, may be able to look straight forward ahead with fixation without turning his/her head to one side for the viewer's eye with impaired retina to see a central portion of the image. The eye tracking module 120 may detect the location and size of the pupil of the viewer's eye with impaired retina, and then determine whether the pupil is located at the center of the viewer's eye. The virtual image display module 120 projects light signals onto the predetermined alternate retinal location when the pupil is located at the center of the viewer's eye. The virtual image display module 120 may pause the projection when the pupil is off the center of the viewer's eye to a predetermined extent, for example 1 degree, because in that situation the light signals will be projected onto a separate location different from the alternate retinal location intended for training. When the pupil is off the center of the viewer's eye to a certain extent, the lights signals may not even be able to pass through the pupil because the system is calibrated for the viewer to project light signals to a fixed location.

Figure 4A:
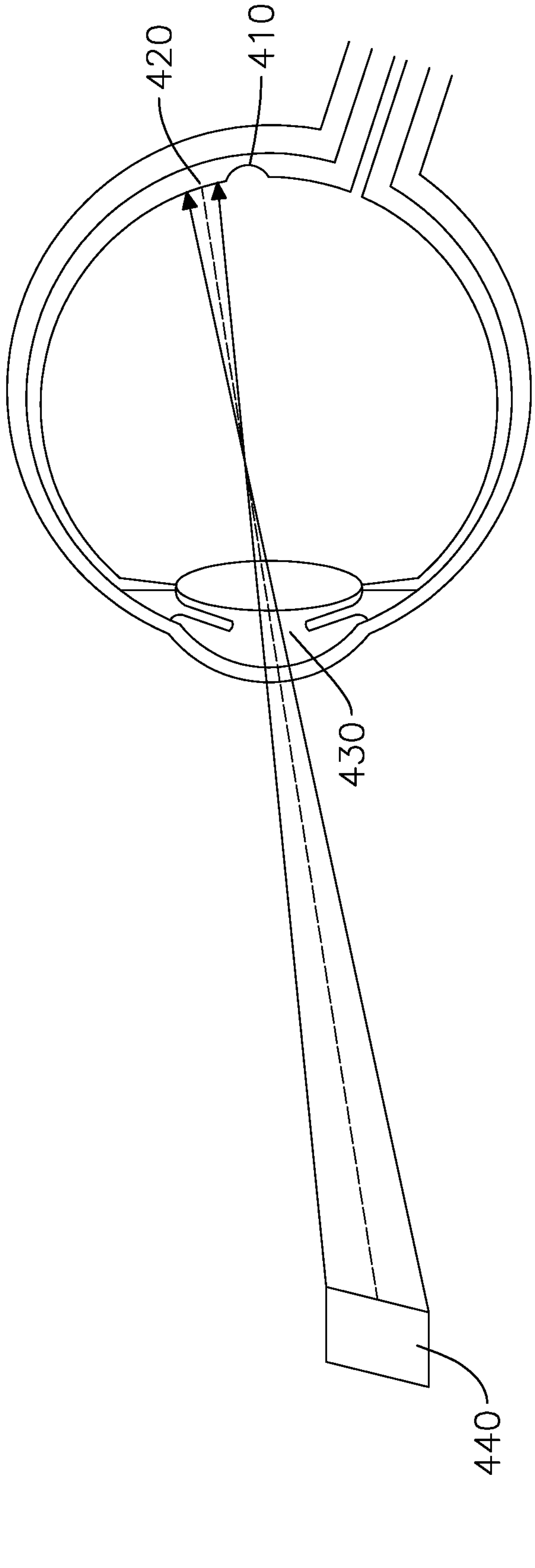
FIGS. 4A-4C are schematic diagrams illustrating an embodiment of virtual image display module projecting light signals forming the virtual image centered at an alternate retinal location through different light paths in accordance with the present invention.
Figure 4B:
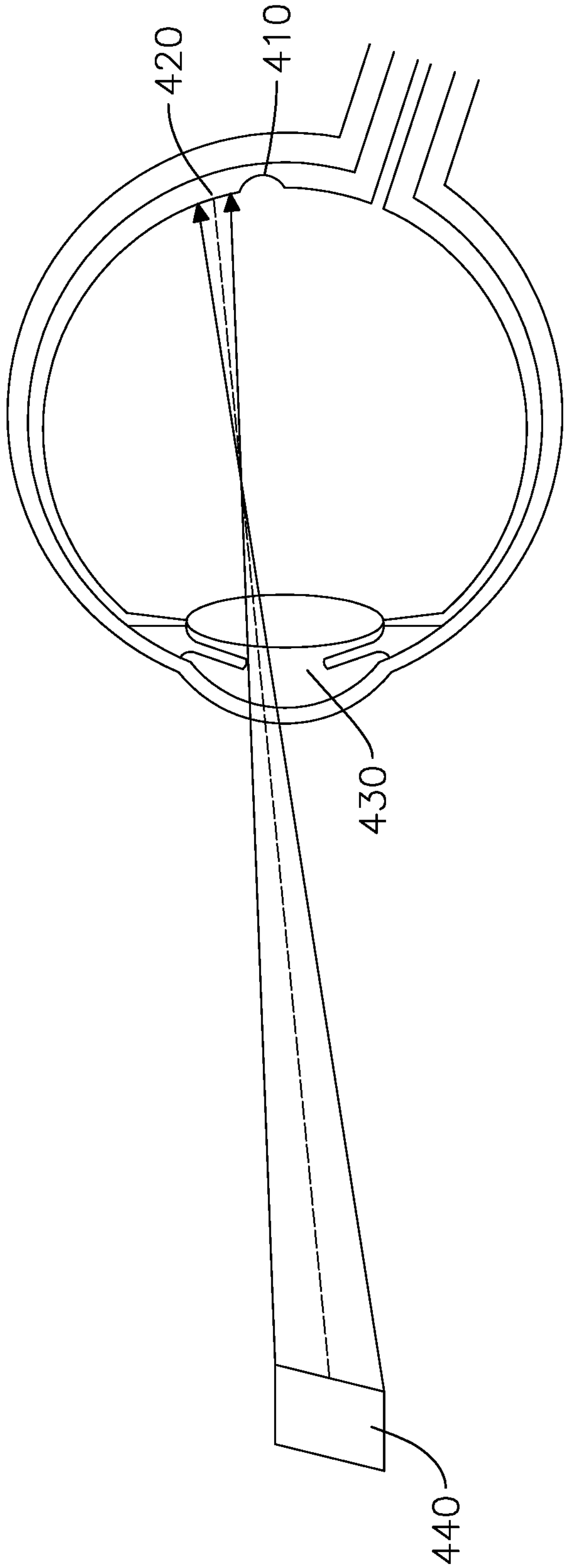
Figure 4C:
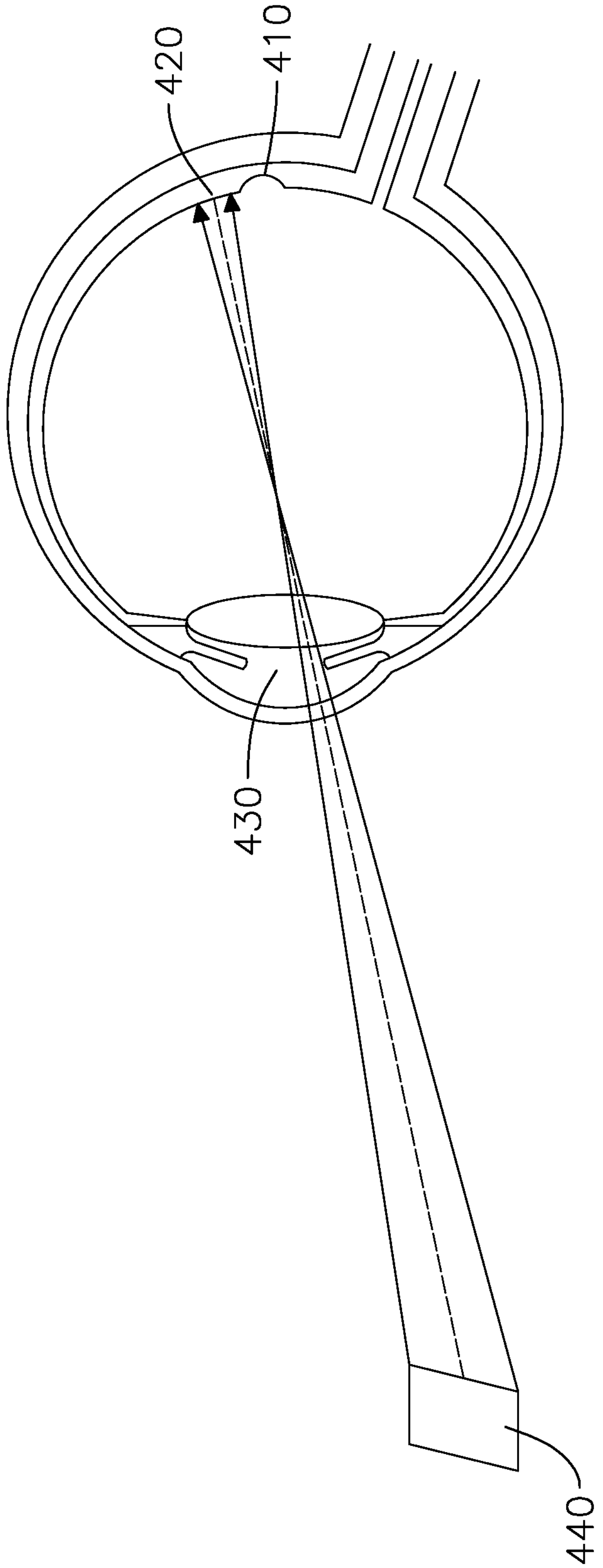

As shown in FIGS. 4A-4C, the virtual image display module 120 may project light signals forming the virtual image 440 towards the alternate retinal location 420 through different light paths. Specifically, the virtual image is projected onto a region of the viewer's retina centered at the alternate retinal location 420, rather than centered at the fovea 410. In one embodiment, the virtual image may contain 921,600 pixels in a 1280×720 array. The light signals forming the virtual image collectively may be considered as a light beam. Based on the light path of the center of the light beam, the light path of the projection of light signals may be divided into three categories. In FIG. 4A, the light signals forming the virtual image 440 are projected through approximately the center portion of the pupil 430; in FIG. 4B, the light signals forming the virtual image 440 are projected thorough the upper portion of the pupil 430; in FIG. 4C, the light signals forming the virtual image 440 are projected thorough the lower portion of the pupil 430. Alternatively, the light signals forming the virtual image 440 may be projected through the right portion or the left portion of the pupil 430. There may be some advantages to project the light signals forming the virtual image through approximately the center portion of the pupil. First, the virtual image is less likely to be partially blocked even if the size of the pupil is smaller due to strong environmental lights. Second, the incident angle is generally smaller for lights signals of the virtual image to be projected onto the alternate retinal location. The first combiner 20 and/or the supplemental first combiner 25 may be adjusted to carry out the projection of light signals through a selected light path.

The system 100 may further comprise a fundus perimetry 130 to conduct a visual field test by generate a "retinal sensitivity map" of the quantity of light perceived in specific parts of the retina in a viewer's eye. To reduce duplication, the fundus perimetry 130 may share the light source 11 and some optical components with the virtual image display module 120. In one embodiment as shown in FIG. 3, the fundus perimetry 130 comprises the light source 11, a set of optical components 131, a light intensity sensor 136, and a perimetry controller 138. The set of optical components 131 may include three reflectors 132, 133, and 134 to guide the lights reflected from the viewer's eye onto the light intensity sensor 136, which may be a CCD (charge coupled device). The perimetry controller 138 may receive electric signals from the light intensity sensor 136 to generate the retinal sensitivity map, such as FIG. 5, which provides information for a doctor to select an alternate retinal location. The alternate retinal location may be selected based on some guidance to facilitate fixation. In one embodiment, the fundus perimetry 130 may be a microperimetry or a scanning laser ophthalmoscopy (SLO).

Figure 5:
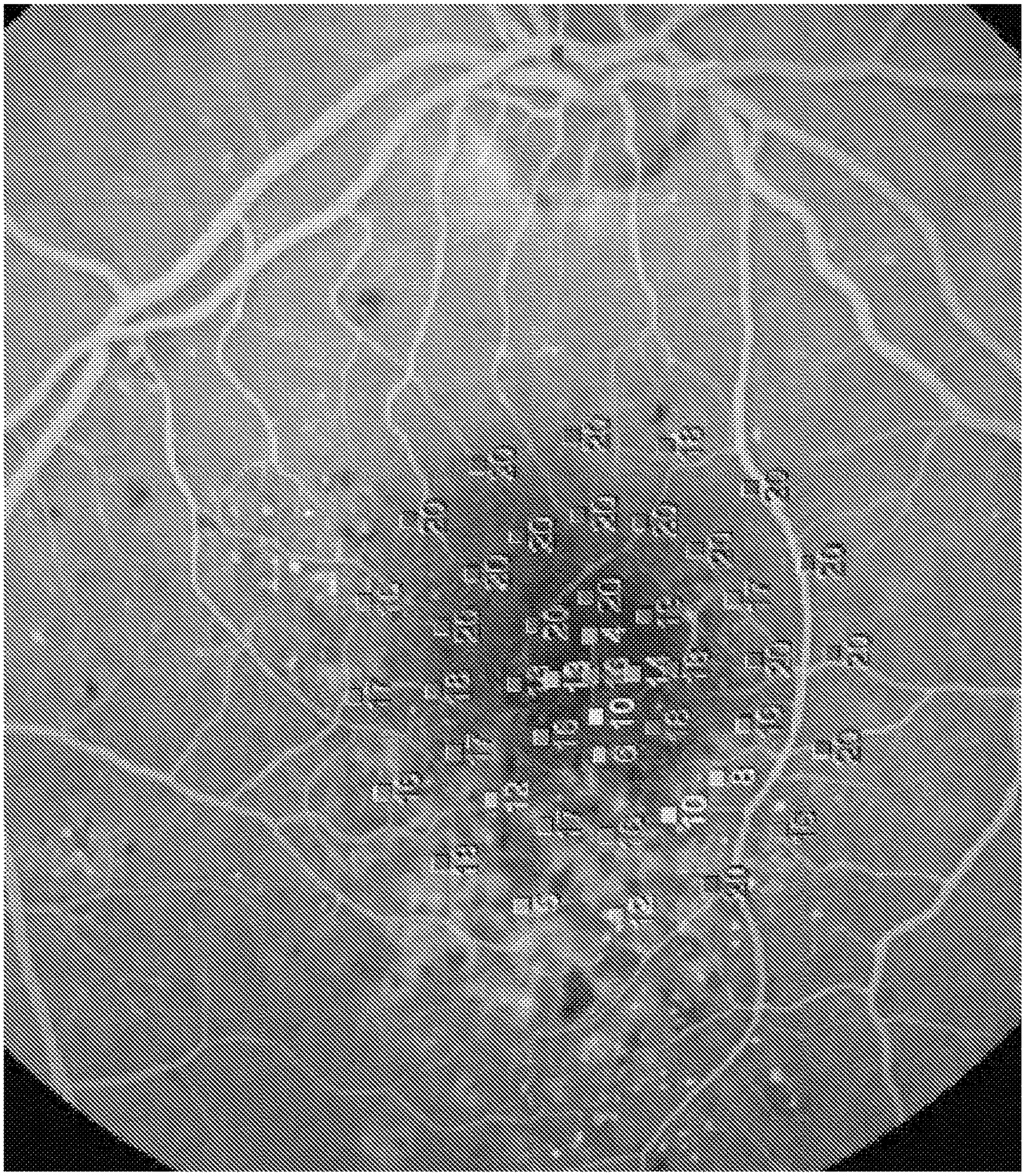
FIG. 5 is an image illustrating an embodiment of a microperimetry image in accordance with the present invention.

As described before, for patients with impaired retina, the alternate retinal location is selected from a portion of retina that remains healthy. Multiple locations on the viewer's retina may be available to serve as the alternate retinal location. As shown in FIG. 5, a microperimetry map illustrates the healthy degree of the viewer's retina usually in colors, for example green means healthy (fully functional), yellow means partially damaged but may still functional to certain extent (partially functional), red means damaged (non-functional). Thus, the color of each small square in FIG. 5 represents the functional level of the retina at each specific location. Usually color green means full functional; color yellow means partially functional; and color red means non-functional. The selection of an alternate retinal location from these multiple available healthy locations for training would affect the possibility of binocular fusion between the viewer's two eyes, for example, one AMD eye and one normal eye or both AMD eyes. Thus, the alternate retinal location needs to be selected to facilitate binocular fusion. The selection guidance of alternate retinal location includes (1) the height of the alternate retinal location and (2) relative position of the alternate retinal location to the fovea to allow binocular fixation when eyeballs turn around. First, a first height of the alternate retinal location of the viewer's eye with impaired retina should be selected to be closer to a second height of a preferred sensing location of the viewer's the other eye with or without impaired retina. Binocular fixation would occur easier if the alternate retinal location of the viewer's eye with impaired retina is at approximately the same height as the preferred sensing location, for example fovea of a normal eye, of the viewer's the other eye. In other words, the first height is about the same as the second height. Second, the alternate retinal location should be selected at an outer side of the fovea of the viewer's eye with impaired retina so that when the viewer's eyeballs fixate at a peripheral region of his/her visual field, the visual axis of both eyes from either the alternate retinal location or the preferred sensing location may cross each other at the target object where viewer's eyes fixate.

Figure 6:
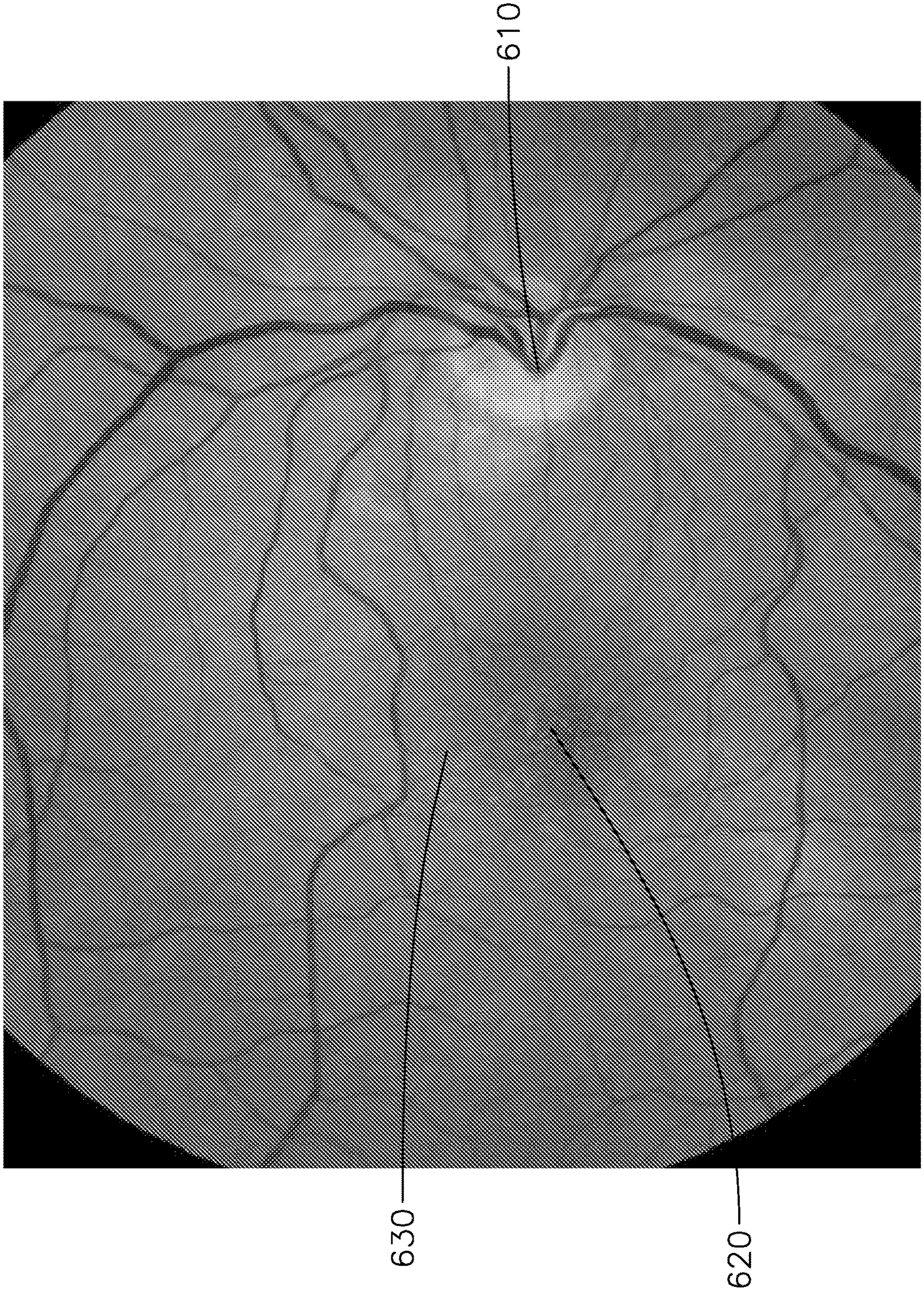
FIG. 6 is an image illustrating an embodiment of a fundus map showing relative locations of an alternate retinal location, an optic nerve head, and a fovea in accordance with the present invention.
Figure 7A:
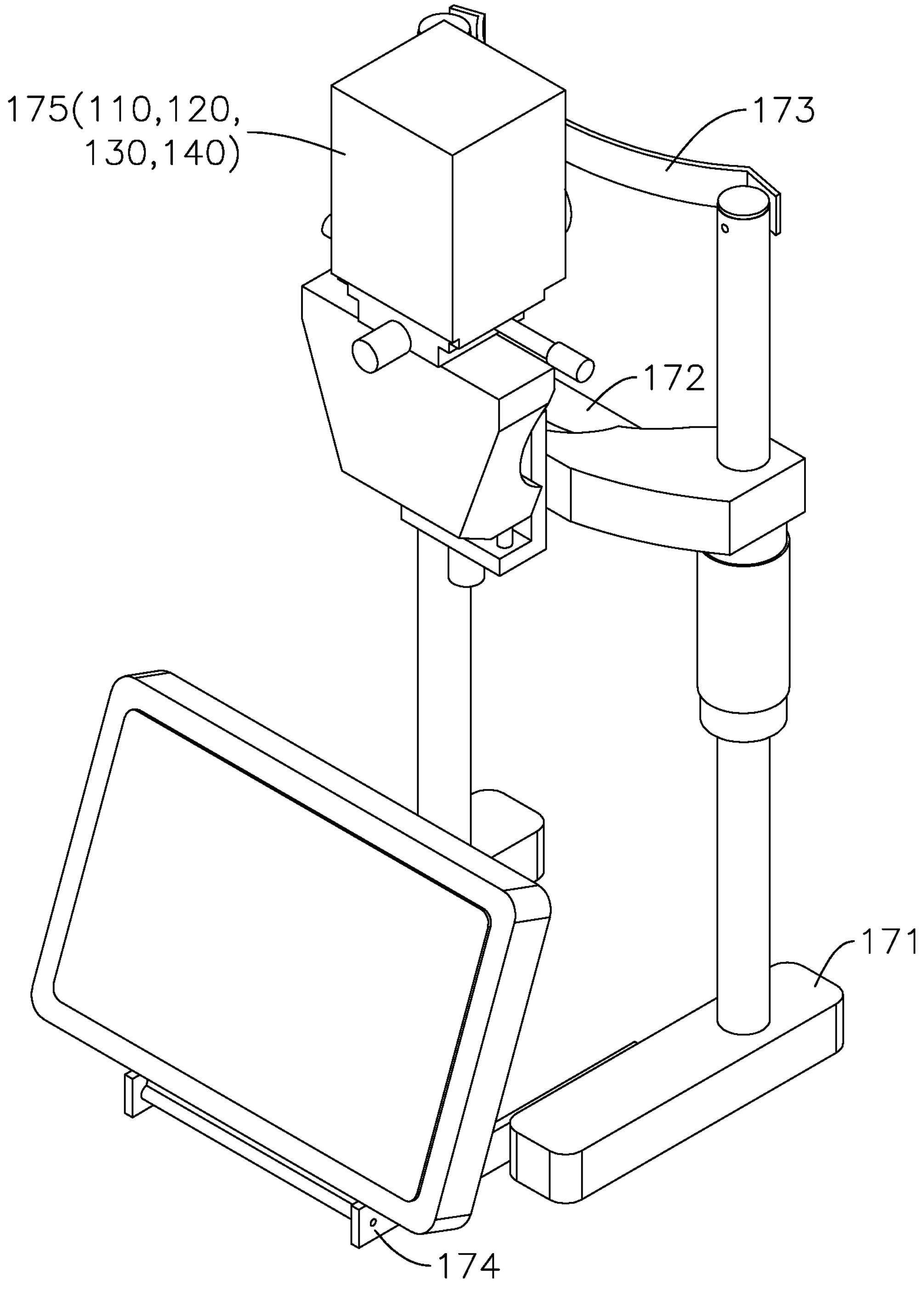
FIG. 7A-7D are schematic diagrams illustrating an embodiment of a portable system for training an alternate retinal location on a viewer's eye with impaired retina in accordance with the present invention.
Figure 7B:
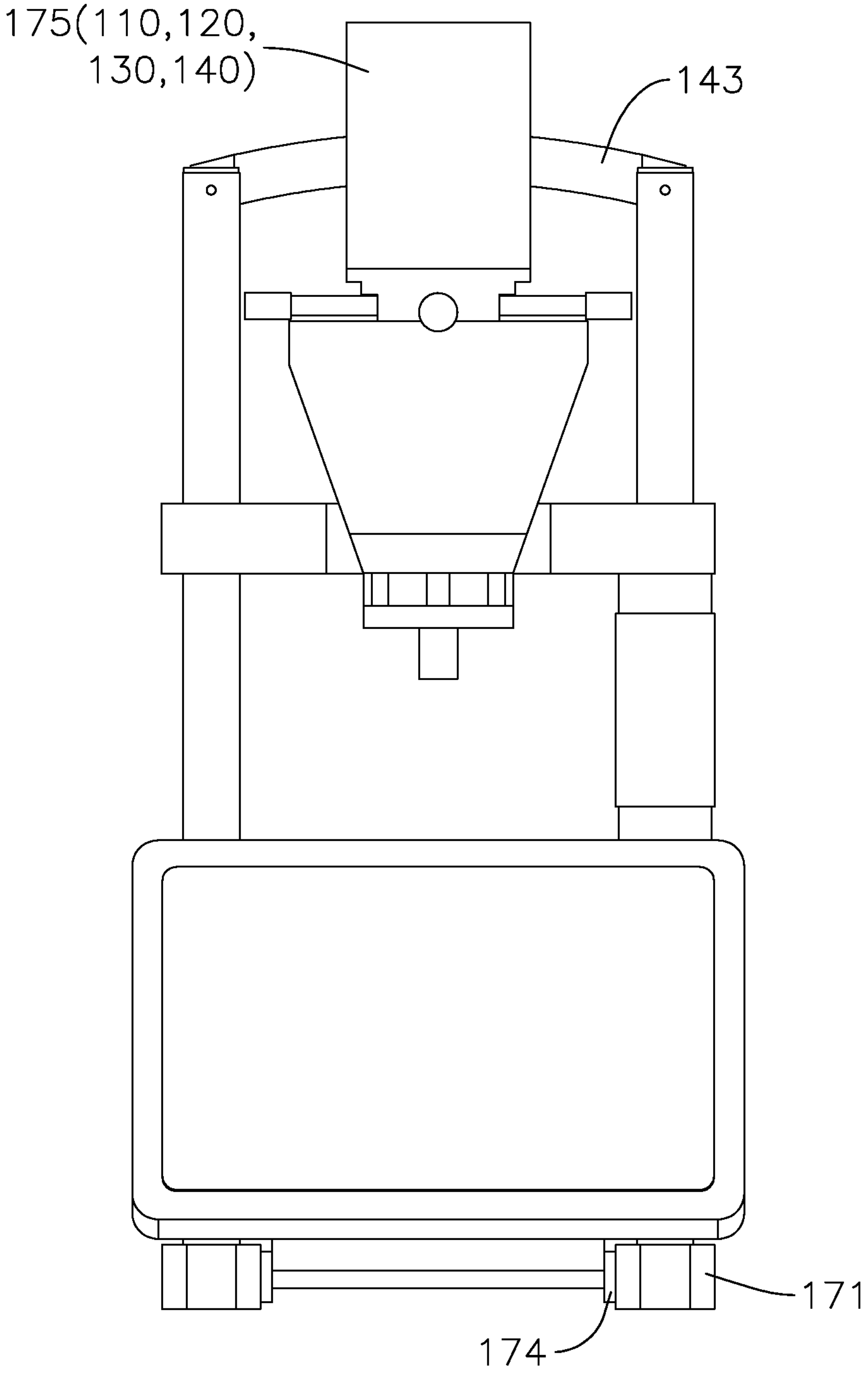
Figure 7C:
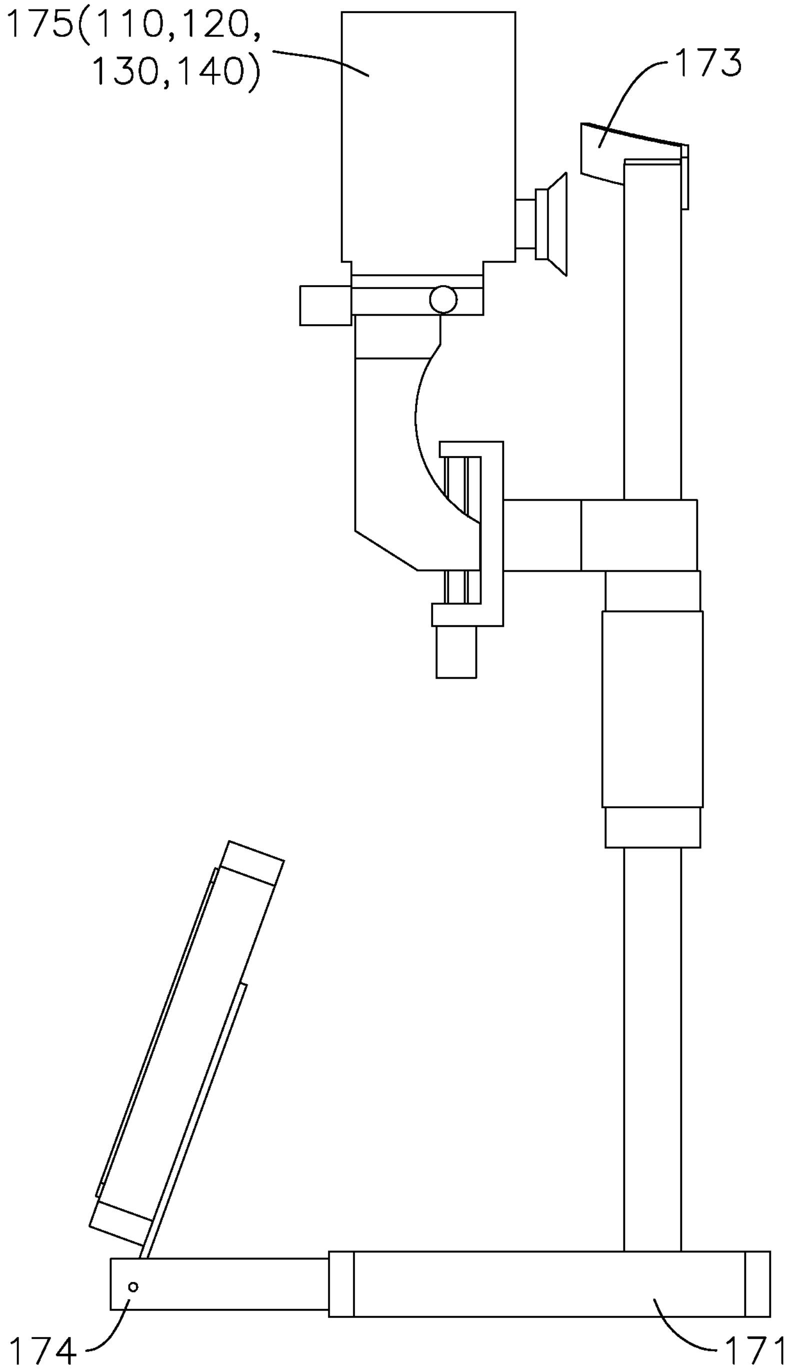
Figure 7D:
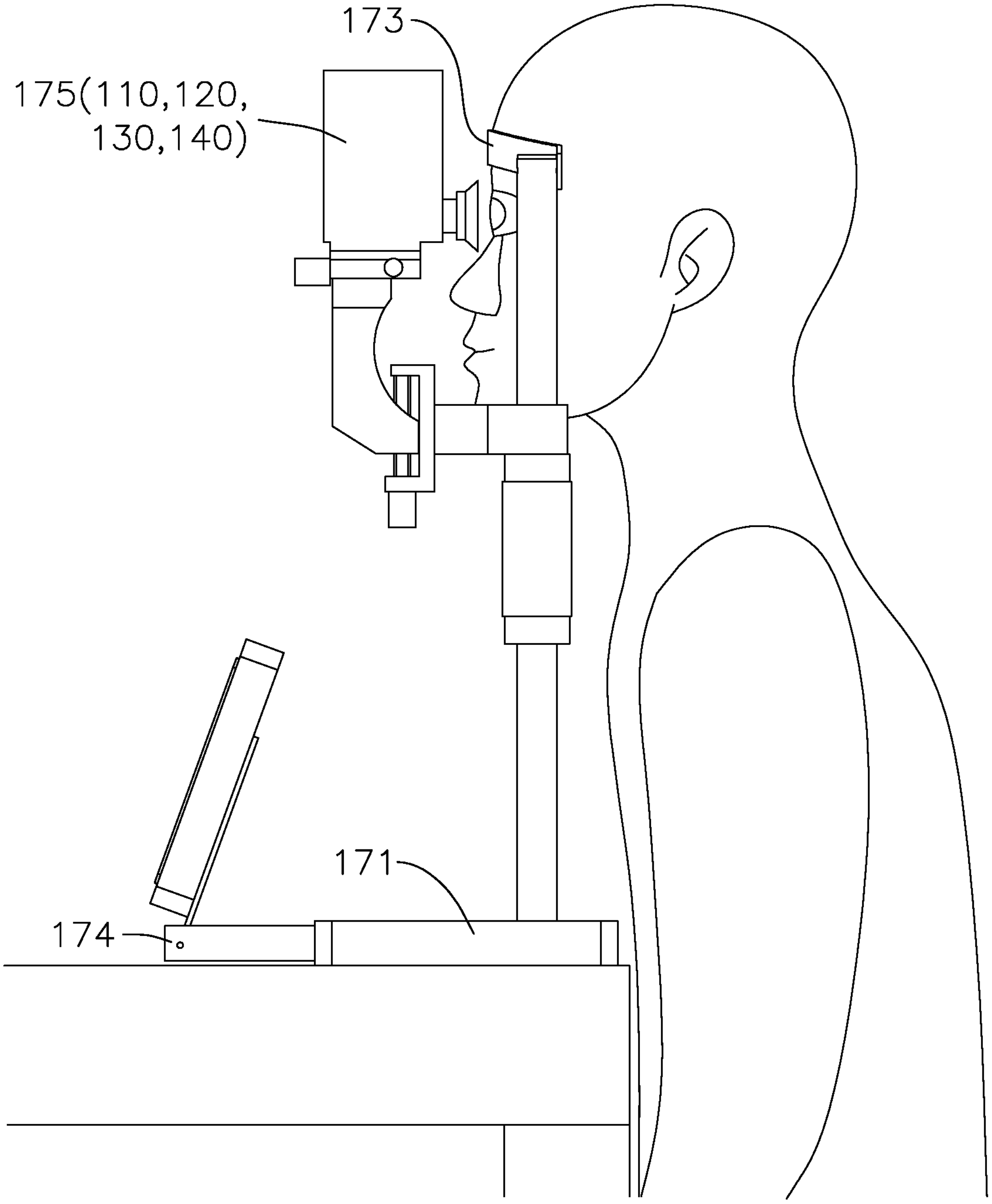

Once the alternate retinal location 630 is determined, a 2D coordinate is generated to accurately indicate the whereabouts of the alternate retinal location based on a landmark. In one embodiment as shown in FIG. 6, an optic nerve head 610 of the viewer's eye is used as a landmark to derive a location of a fovea 620. Then assuming the fovea 620 is the origin with a coordinate (0,0), the coordinate of the alternate retinal location 630 may be obtained.

The system 100 may further comprise a process module 140 to execute a training program for the viewer. The process module 140 may include a processor and a memory to function as a calculation power center for other modules of the system 100, such as the eye tracking module 110 and the virtual image display module 120. A training application/software may be installed in the process module 140 to provide training programs to viewers. The training program may be customized for each individual. In addition, since the system 100 is portable, viewers can easily conduct the training at home. In one embodiment, a training session is about 15 minutes. The period of time the viewer's eye blinks may not be counted into the duration of a training session. An artificial intelligence (AI) model may be used to determine whether the eye blinking occurs. The shape, the size, and the color of the virtual image used for training, such as a cross in red or green color or a circle in red or green color, may be selected from the program. At the beginning of the training when the viewer's pupil may often drift around out of the center of the eye, a larger virtual image may be used for training. When the viewer's pupil may fixate straightforward ahead for a longer period of time, a smaller virtual image may be used for training. The training program may record all related data detected during the training session and generate a training report. All related training data and reports may be uploaded remotely to information systems in clinics or hospitals for doctors' diagnosis.

The system 100 may further comprise a feedback module 150 configured to provide a feedback to the viewer when the viewer's pupil is more than a predetermined degree away from the center of the viewer's eye, for example 0.5 degree, based on the eye information from the eye tracking module 110. In other words, when the viewer's eyes no longer fixate straightforward ahead and the visual axis of the viewer's eye is not normal to a frontal plane of the viewer, the feedback module 150 may provide a sound and/or vision feedback to guide the viewer's pupil back to the center of the eye. The vision guidance includes a visual indicator to direct a movement direction of the viewer's eye, such as a flashing arrow showing the direction the viewer's pupil should move. Such a visual guidance may be displayed by the virtual image display module 120. The sound guidance includes a vocal feedback to indicate a direction for movement of the viewer's eye, which may be carried out by a speaker.

The system 100 may further comprise an interface module 160 which allows the viewer to control various functions of the system 100. The interface module 160 may be operated by voices, hand gestures, finger/foot movements and in the form of a pedal, a keyboard, a mouse, a knob, a switch, a stylus, a button, a stick, a touch screen, etc.

As shown in FIGS. 7A-7D, the portable system 100 may further comprises a frame 170 which includes a base 171, a chin holder 172, a forehead rest 173, and a tablet connector 174, in addition to a light engine 175 which includes the eye tracking module 110, the virtual image display module 120, the fundus perimetry module 130, and the process module 140. The height of the chin holder 172 is adjustable. The relative location of the forehead rest 173 may be adjusted toward or away from a viewer. In one embodiment, the size of the system 100 with the frame 170 is approximately of 50-65 cm height, 30 cm width, and 30 cm depth. In addition, in one embodiment, the weight of the system 100 with the frame 170 is approximately 3 kg.

Figure 8:
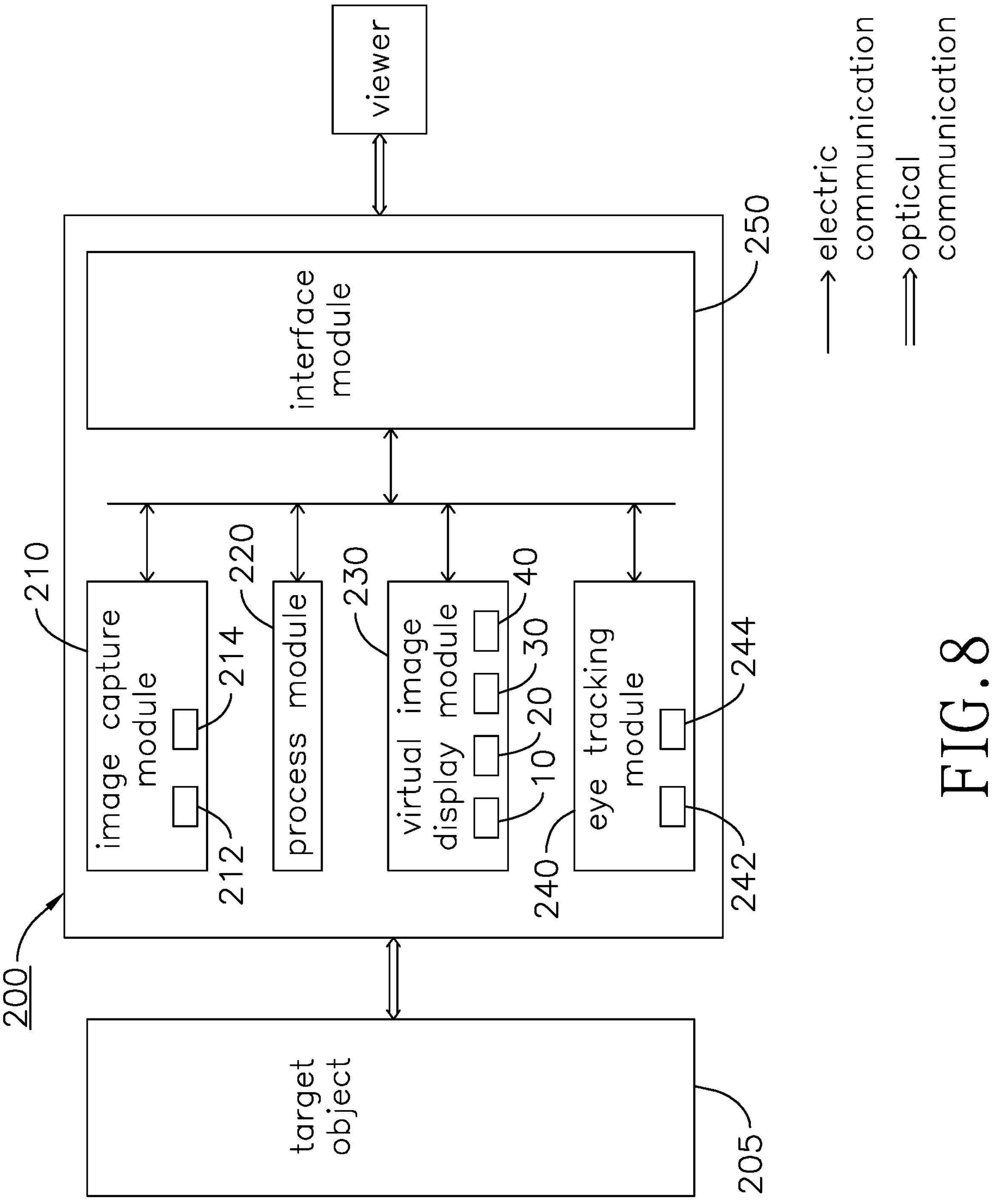
FIG. 8 is a block diagram illustrating an embodiment of an assistance system for improving vision of a viewer's eye with impaired retina in accordance with the present invention.
Figure 9A:
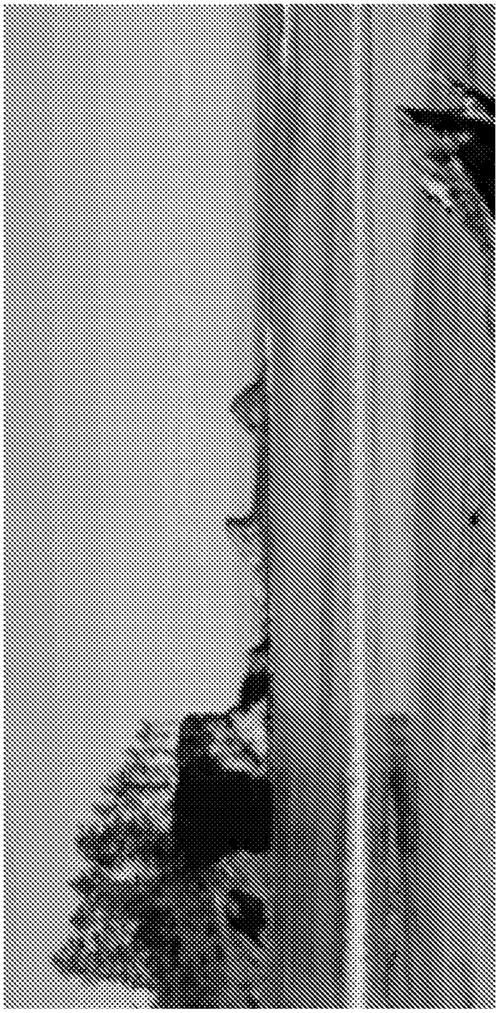
FIGS. 9A-9C are images illustrating an embodiment of views related to glaucoma in accordance with the present invention.
Figure 9B:
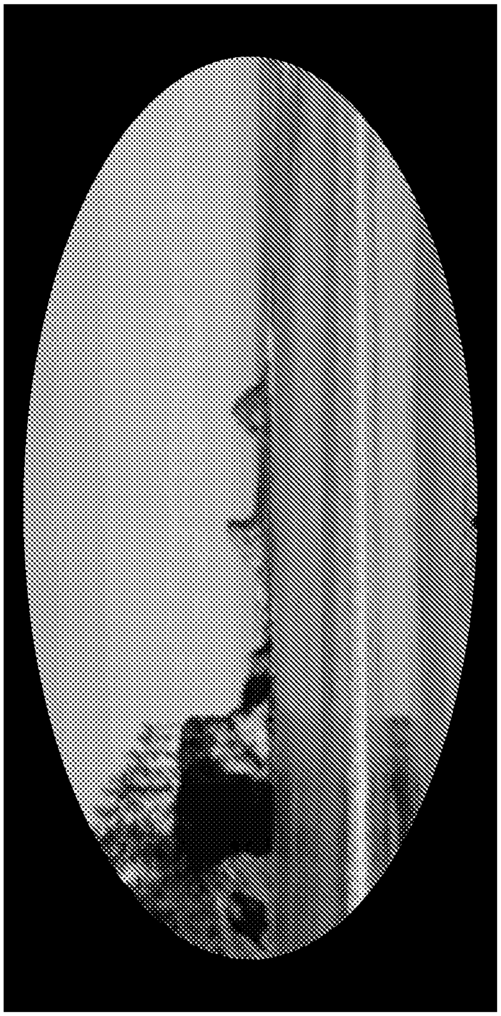
Figure 9C:

After the viewer's eye with an alternate retinal location is trained for fixation by the portable system 100, the viewer may use a system 200 to improve the vision of his or her eye with impaired retina by projecting a virtual image corresponding to a target object onto the trained alternate retinal location of the viewer's eye with impaired retina. As shown in FIG. 8, the system 200 for improving vision comprises an image capture module 210, a process module 220, and a virtual image display module 230. The image capture module 210 is configured to receive multiple image pixels and the corresponding depths of a target object 205. In one embodiment, the image capture module 210 captures the straightforward view ahead of the viewer's both eyes as the target object. In other words, the view angle of the image capture module 210 is normal to the frontal plane of the viewer wearing the assistance system 200. The process module 220 generates information of a virtual image related to the target object. The virtual image display module 230, based on the information of the virtual image, to display the virtual image at the viewer's eye with an impaired retina. For viewers with impaired macula, in particular the fovea and its adjacent region, such as AMD patients, the virtual image display module 230 may project the virtual image centered at the alternate retinal location of the viewer's eye other than centered at a fovea. For viewers with impaired retina at peripheral regions of their vision field, such as glaucoma patients, the virtual image display module 230 projects the virtual image centered at the central region of the macula that remains healthy, including fovea and its neighboring region. In this situation, as shown in FIGS. 9A-9C, the virtual image may be shrunk into a smaller size because the portion of retina remains healthy in the central region that can receive and respond to light signals is smaller. As a result, the shrunk virtual image with the same field of vision, although smaller in size, would be perceived like the target object is originally taken by the image capture module 210. FIG. 9A shows a view perceived by a viewer's healthy eye. FIG. 9B shows a view perceived by a viewer's eye with glaucoma. FIG. 9C shows a view perceived by a viewer's eye with glaucoma when the virtual image display module 230 projects a shrunk virtual image of the target object onto the fovea regions of the viewer's eye with impaired retina. To avoid interruption of natural lights received by the viewer's eye from the environment, the system 200 may reduce or block the natural lights from entering the viewer's eye with impaired retina. As a result, the viewer's eye with impaired retina would perceive primarily or almost only the virtual image projected by the virtual image display module 230. The virtual image perceived by the viewer's eye with impaired retina and the real image perceived by the viewer's the other eye that remains healthy may fuse at least partially into one image. The binocular fusion may also occur when each of the viewer's both eyes has impaired retina and respectively receives a virtual image from the virtual image display module 230.

The assistance system 200 for improving vision may further comprise an eye tracking module 240, and an interface module 250. Similar to the eye tracking module 110 in the training system 100, the eye tracking module 240 in the assistance system 200 may be configured to track a viewer's one eye or both eyes, and provide related eye information, such as eye movement, pupil location, pupil size, gaze angle (view angle; view axis), and convergence angle of the viewer's eye. The eye tracking module 240 may further comprise cameras 242, 244 to determine the target object based on fixation of the viewer's one or both eyes. The interface module 250 which allows the viewer to control various functions of the system 200. The interface module 250 may be operated by voices, hand gestures, or finger movements and in the form of a pedal, a keyboard, a mouse, a knob, a switch, a stylus, a button, a stick, a touch screen, etc.

Figure 10:
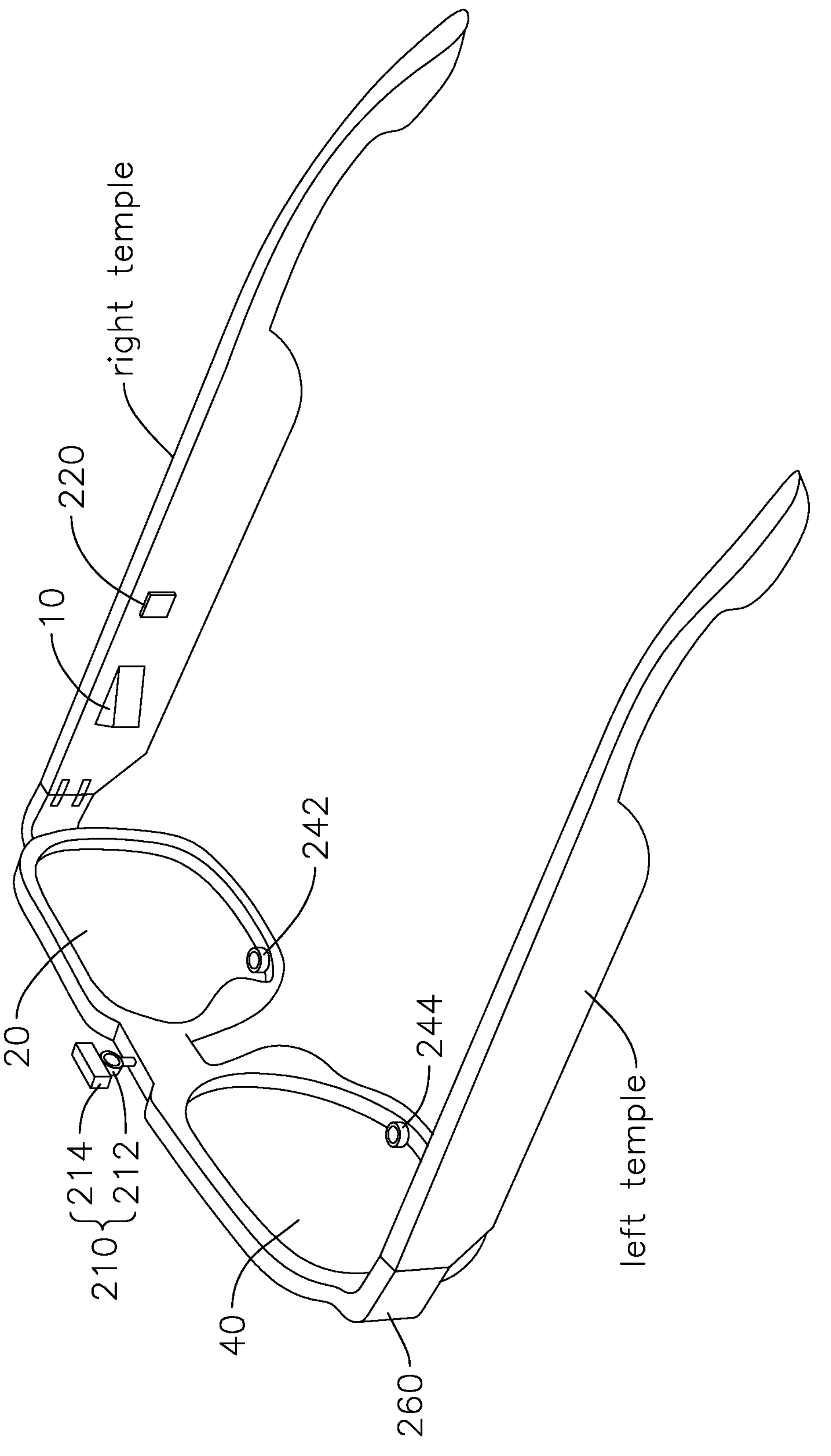
FIG. 10 is a schematic diagram illustrating an embodiment of an assistance system for improving vision of a viewer's eye with impaired retina in accordance with the present invention.

As shown in FIG. 10, the system 200 further includes a support structure 260 that is wearable on a head of the viewer. The image capture module 210, the process module 220, the virtual image display module 230 (including a first light signal generator 10, a first combiner 20, and even a second light signal generator 30, and a second combiner 40) are carried by the support structure. In one embodiment, the system 200 is a head wearable device, such as a virtual reality (VR) goggle and a pair of augmented reality (AR)/mixed reality (MR) glasses. In this circumstance, the support structure may be a frame with or without lenses of the pair of glasses. The lenses may be prescription lenses used to correct nearsightedness, farsightedness, etc. In addition, the eye tracking module 240, the interface module 250 may be also carried by the support structure.

The image capture module 210 may simply comprise at least one RGB camera 212 to receive multiple image pixels, the target image, of the target object. In another embodiment, the image capture module 210 may further comprise at least one depth camera 214 to receive the corresponding depths of the multiple image pixels. Alternatively, the image capture module 210 may include a positioning component to receive both multiple image pixels and the corresponding depths of the target object. To measure the depths of the target object and the environment, the depth camera 214 may be a time-of-flight camera (ToF camera) that employs time-of-flight techniques to resolve distance between the camera and an object for each point of the image, by measuring the round-trip time of an artificial light signal provided by a laser or an LED, such as LiDAR. A ToF camera may measure distance ranging from a few centimeters up to several kilometers. Other devices, such as structured light module, ultrasonic module or IR module, may also function as a depth camera used to detect depths of the target object and the environment.

Figure 11A:
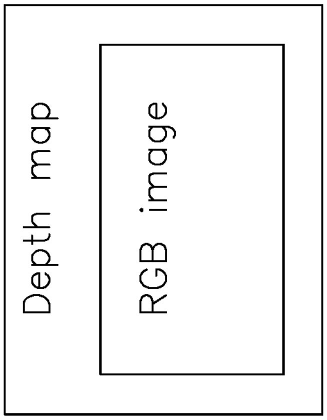
FIG. 11A-11B are schematic diagrams illustrating an embodiment of adjusting a captured image with depth information in accordance with the present invention.
Figure 11B:
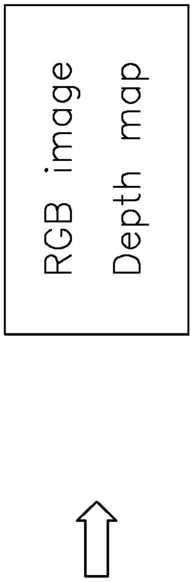

To incorporate the information of corresponding depths into the multiple image pixels to derive more accurate coordinates of the target object and its shape, an adjustment process is conducted. The multiple image pixels provide a 2D coordinate, such as XY coordinate, for each feature point of the target object. However, such a 2D coordinate is not accurate because the depth is not taken into consideration. Thus, as shown in FIGS. 11A-11B, the image capture module 210 may align or overlay the RGB image comprising the multiple image pixels and the depth map so that the feature point in the RGB image superimpose onto the corresponding feature point on the depth map. The depth of each feature point is then obtained. The RGB image and the depth map may have different resolutions and sizes. Thus, in an embodiment as shown in FIG. 11B, the peripheral portion of the depth map which does not overlay with the RGB image may be cropped. The depth of a feature point is used to calibrate the XY coordinate from the RBG image to derive the real XY coordinate. For example, a feature point has an XY coordinate (a, c) in the RGB image and a z coordinate (depth) from the depth map. The real XY coordinate would be (a+b*depth, c+d*depth) where b and d are calibration parameters, and the symbol "*" means multiply. Accordingly, the image capture module 210 employs the multiple image pixels and their corresponding depths captured at the same time to adjust horizontal coordinates and longitudinal coordinates respectively for the target object.

The process module 220 may include a processor and a memory to generates information of a virtual image related to the target object. In addition, the process module 220 may function as a calculation power center for other modules of the system 200, such as the image capture module 210 and the virtual image display module 230. To generate information of the virtual image, a view angle of the target object from the viewer's eye with impaired retina and other 3D related effects, such as intensity, and brightness of the red, blue, and green colors as well as shades may be considered.

Similar to the virtual image display module 120 in the portable training system 100, the virtual image display module 230 in the vision assistance system 200 comprises a first light signal generator 10 and a first combiner 20 for projecting the virtual image into the viewer's eye with impaired retina. The virtual image display module 230 may further comprise the second light signal generator 30 and the second combiner 40 for the viewer's the other eye which may also have impaired retina or remain healthy. The previous descriptions about the first light signal generator 10 and the first combiner apply 20 to the second light signal generator 30 and the second combiner 40. Again, for viewers with impaired central region of macula, in particular the fovea and its adjacent region, such as AMD patients, the first light signal generator 10 generates multiple first light signals for the virtual image based on the information from the process module 220. The first combiner 20 redirects the multiple first light signals from the first light signal generator 10 towards the alternate retinal location of the viewer's eye, other than the impaired fovea and its adjacent region, to display multiple first pixels of the virtual image. For viewers with impaired retina at peripheral regions of their vision field, such as glaucoma patients, the first light signal generator 10 generates multiple first light signals for the virtual image based on the information from the process module 220. The first combiner 20 redirects the multiple first light signals from the first light signal generator 10 towards the central region of the macula that remains healthy, including fovea and its neighboring region.

Again, the virtual image display module 230, for example by adjusting the combiner 20, 40, may project light signals forming the virtual image onto the alternate retinal locations or the preferred sensing location, such as fovea and its neighboring region, through different light paths. In general, the light signals forming the virtual image may be projected through approximately the center portion of the pupil, the right portion of the pupil, the left portion of the pupil. In one embodiment, the light signals forming the virtual image are projected through approximately the center portion of the pupil to avoid any part of the virtual image is blocked because the size of the pupil is smaller due to strong environmental lights.

To reduce or block the natural light from the environment, the transparency of the first combiner 20 and the second combiner 40 may be adjusted back and forth when necessary automatically or via the interface module 250 by the viewer. In another embodiment, the assistance system 200 may further comprise a light blocker to reduce or block natural light from the environment from entering the viewer's eye(s).

In addition to a red color light laser, a green color light laser, and a blue color light laser, the light source 11, 21 of the first light signal generator 10 and the second light signal generator 20 may further include an IR (infrared) light laser, such as a micro pulse generator, to generate low power and high-density electromagnetic wave with wavelength at about 532 nm, 577 nm or 810 nm to radiate the viewer's retina for massaging function. In one embodiment, the 810 nm infrared lights are generated to radiate on the viewer's retina. The heat shock protein (HSP) will be generated under the radiation of such electromagnetic waves. HSP can help the cell reactivation in the retina so that the age-related macular degeneration progress might be slow down. Moreover, since the infrared is invisible to the human eyes, it may be radiated on the viewer's retina simultaneously when the red, green, blue lasers of the light source 11, 21 generate the virtual image to be projected onto the viewer's retina. As a result, the infrared lights do not interfere with the virtual images being composed of red, green, blue light signals. Alternatively, the IR lights may be projected between 2 continuous image frames.

As shown in FIG. 3, an intensity of the IR lights used to radiate the viewer's retina has to be monitored and controlled to avoid damages to the retina. A lens 310 is used to collect IR lights reflected from the viewer's eye for an IR light sensor 320 to measure its intensity. When the intensity is too low, a photomultiplier tube (PMT) 330 is used to multiply the intensity signal. An IR intensity controller 340 is used to determine whether the intensity of the IR laser diode 14 needs to be adjusted. If an adjustment is needed, the IR intensity controller 340 sends a signal to the first light signal generator 10 requesting for an adjustment.

In another embodiment, the light source 11, 31 of the light signal generator 10, 30 may further include a light generator which provides lights with a specific wave length to activate the Channelrhodopsins that function as light-gated ion channels, so as to assist therapy of Optogenetics for those people have retinitis pigmentosa (RP). This clinical treatment is first developed by RetroSense Therapeutics, which is a biotechnology company developing life-enhancing gene therapies designed to restore vision in patients suffering from blindness due to retinitis pigmentosa (RP). Retinitis pigmentosa (RP) is a group of inherited genetic disorders characterized by progressive peripheral vision loss and night vision difficulties followed by eventual central vision loss and blindness in many cases. RP is typically diagnosed in adolescents and young adults.

All components in either the training system 100 or the assistence system 200 may be used exclusively by a module or shared by two or more modules to perform the required functions. In addition, two or more modules described in this specification may be implemented by one physical module. One module described in this specification may be implemented by two or more separate modules. An external server is not part of the assistence system 200 but can provide extra computation power for more complicated calculations. Each of these modules described above and the external server may communicate with one another via wired or wireless manner. The wireless manner may include WiFi, bluetooth, near field communication (NFC), internet, telecommunication, radio frequency (RF), etc.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A system for improving vision of a viewer's eye with impaired retina, comprising:

an image capture module configured to receive an image pixel of each of feature points of a target object and a corresponding depth of the image pixel;

a process module configured to generate information of a virtual image related to the target object;

an eye tracking module configured to provide an eye information of the viewer's eye; and a virtual image display module, based on the information of the virtual image, to display the virtual image centered at an alternate retinal location on the viewer's eye other than centered at a fovea, comprising:

a first light signal generator generating multiple first light signals for the virtual image; and a first combiner configured to, when a pupil of the viewer's eye is located approximately at a center of the viewer's eye, based on the eye information from the eye tracking module, redirecting the multiple first light signals from the first light signal generator towards the alternate retinal location on the viewer's eye to display the virtual image;

the virtual image perceived by the viewer's eye and an image perceived by the viewer's other eye at least partially fuse;

wherein the image pixel comprises a horizontal coordinate and a longitudinal coordinate; and wherein the image capture module employs the corresponding depth to adjust the horizontal coordinate and the longitudinal coordinate of the image pixel.

2. The system of claim 1, wherein the alternate retinal location on the viewer's eye is selected to have a first height closer to a second height of a preferred sensing location of the viewer's the other eye.

3. The system of claim 1, wherein the alternate retinal location on the viewer's retina is selected to be at an outer side of the fovea.

4. The system of claim 1, wherein natural lights from an environment are reduced or blocked from entering onto the viewer's eye.

5. The system of claim 1, wherein the information of the virtual image is generated with a view angle of the viewer's eye with the impaired retina.

6. The system of claim 1, further comprising a support structure wearable on a viewer's head;

wherein the image capture module, the process module, and the virtual image display module are carried by the support structure.

7. The system of claim 1, wherein the eye tracking module determines the target object based on fixation of one or both of the viewer's eyes.

8. The system of claim 1, wherein the first combiner redirects the multiple first light signals to the alternate retinal location on the viewer's eye through approximately a center of the pupil of the viewer's eye.

* * * * *